US007371786B2

United States Patent
Yoshihara et al.

(10) Patent No.: US 7,371,786 B2
(45) Date of Patent: May 13, 2008

(54) COATING COMPOSITION, COATING FORMED THEREFROM, ANTI-REFLECTION COATING, ANTI-REFLECTION FILM, AND IMAGE DISPLAY DEVICE

(75) Inventors: Toshio Yoshihara, Tokyo-to (JP); Takahiro Niimi, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 341 days.

(21) Appl. No.: 10/488,434

(22) PCT Filed: Sep. 3, 2002

(86) PCT No.: PCT/JP02/08928

§ 371 (c)(1),
(2), (4) Date: Sep. 23, 2004

(87) PCT Pub. No.: WO03/027189

PCT Pub. Date: Apr. 3, 2003

(65) Prior Publication Data

US 2005/0038137 A1    Feb. 17, 2005

(30) Foreign Application Priority Data

Sep. 4, 2001   (JP)   ............................. 2001-267209
Sep. 25, 2001  (JP)   ............................. 2001-291069

(51) Int. Cl.
*C08K 9/00*  (2006.01)
(52) U.S. Cl. ...................... 523/205; 524/401; 524/430; 524/493
(58) Field of Classification Search ................ 523/205; 524/430, 401, 493
See application file for complete search history.

(56) References Cited

U.S. PATENT DOCUMENTS 5,512,225 A * 4/1996 Fukushi ..................... 264/127
6,383,559 B1 * 5/2002 Nakamura et al. .......... 427/180
6,387,519 B1 * 5/2002 Anderson et al. ........... 428/447

(Continued)

FOREIGN PATENT DOCUMENTS

JP          4-164970          6/1992

(Continued)

Primary Examiner—Peter D. Mulcahy
Assistant Examiner—Henry S. Hu
(74) Attorney, Agent, or Firm—Ladas & Parry LLP

(57) ABSTRACT

The present invention provides a coating composition capable of forming a fluorine-containing coating layer having a low refractive index and a high hardness, a coating layer formed by using the coating composition, an anti-reflecting layer using the coating layer and an anti-reflecting film and an image display device to which the anti-reflecting layer is applied. The coating composition according to the present invention comprises (A) a binder system containing a fluorine-containing component (a) having one or both of a functional group which can be cured by ionizing radiation and a polar group which can be heat-cured, and contains both an ionizing radiation-curable group and a heatcurable polar group as a whole and (B) an inorganic superfine particle of the order of submicron in size which can be dispersed in a colloidal state in a liquid medium for preparing a coating liquid. The coating layer formed using this coating composition is preferable for forming a light-transmitting layer, particularly, a low-refractive index layer 20, constituting a monolayer type or multilayer type anti-reflecting layer 17.

27 Claims, 2 Drawing Sheets

U.S. PATENT DOCUMENTS 6,623,791 B2 * 9/2003 Sadvary et al. ............. 427/140
6,683,126 B2 * 1/2004 Keller et al. ................ 524/492
7,172,809 B2 * 2/2007 Barancyk et al. ........... 428/323

FOREIGN PATENT DOCUMENTS

| JP | 6-306326 | 11/1994 |
| JP | 06-306326 A * | 11/1994 |
| JP | 11-43353 | 2/1999 |
| JP | 11-64601 | 3/1999 |
| JP | 11-174971 | 7/1999 |
| WO | WO-03/027189 A1 * | 4/2003 |

* cited by examiner

COATING COMPOSITION, COATING FORMED THEREFROM, ANTI-REFLECTION COATING, ANTI-REFLECTION FILM, AND IMAGE DISPLAY DEVICE

FIELD OF THE INVENTION

The present invention relates to a coating composition capable of forming a fluorine-containing layer having a low refractive index, high hardness and high adhesion, and to a coating layer used preferably as an optical thin layer which has a low refractive index, high hardness, high adhesion and high transparency and is superior in mass-productivity and of which a low refractive index is demanded, and, particularly, as a low-refractive index layer of an anti-reflecting layer.

The present invention also relates to an anti-reflecting layer provided with an optical thin layer formed using the aforementioned coating composition, and an anti-reflecting film and an image display device to which such an anti-reflecting layer is applied.

BACKGROUND ART

It is demanded for the display surfaces of image display devices such as liquid crystal displays (LCDs) and cathode ray tube display devices (CRTs) to reduce the reflection of rays emitted from external light sources such as a fluorescent lamp in order to improve the visibility of these display surfaces.

A phenomenon has been known that reflectance is made smaller by coating the surface of a transparent material with a transparent layer having a small refractive index. It is possible to improve visibility by arranging an anti-reflecting layer utilizing such a phenomenon on the display surface of an image display device. The anti-reflecting layer has a monolayer structure in which a low-refractive index layer having a small refractive index is disposed on a display surface or a multilayer structure in which one or plural layers having middle to high refractive indexes are disposed on a display surface and a low-refractive index layer for decreasing the refractive index of the outermost surface is disposed on these middle to high refractive index layers to produce a higher anti-reflecting effect.

The monolayer type anti-reflecting layer is simpler than the multilayer type and is superior in productivity and cost performance. On the other hand, the multilayer type anti-reflecting layer can be improved in anti-reflecting performance by combining layer structures and is therefore improved in performance more easily than the monolayer type.

Methods of forming a low-refractive index layer included in such an anti-reflecting layer are roughly classified into a vapor phase method and a coating method in general. The vapor phase method includes physical methods such as a vacuum deposition method and sputtering method and chemical methods such as a CVD method. The coating methods include a roll coating method, gravure coating method, slide coating method, spraying method, dipping method and screen printing method.

In the case of using the vapor phase method, a high functional and high quality transparent thin layer can be formed. However, in this method, it is necessary to control the minute atmosphere in a high vacuum system, and also, a specific heating device or an ion generating and accelerating device is required, giving rise to the problem that production equipment is complicated and large-sized, entailing high production costs. Also, in the case of using the vapor phase method, it is difficult to enlarge the area of a transparent thin layer and to form a transparent thin layer in a uniform layer thickness on the surface of a film or the like having a complicated shape.

On the other hand, in the case of using the spraying method among the coating methods, the utility efficiency of a coating liquid is low, posing the problem such as a difficulty in controlling filming conditions. In the case of using the roll coating method, gravure coating method, slide coating method, dipping method or screen printing method, the utility efficiency of layer raw materials is high and there is an advantage in mass-production and equipment cost. However, there is the problem that a transparent thin layer obtained by the coating method is usually more deteriorated in functions and qualities than that obtained by the vapor phase method.

As a coating method, a method is known in which a coating liquid containing a polymer (fluorine-containing polymer) having a fluorine atom in its molecular structure is applied to the surface of a support and dried or a coating liquid containing a monomer (fluorine-containing monomer) having a fluorine atom in its molecular structure is applied to the surface of a support and dried, and then cured by UV radiation to form a low-refractive index layer. A coating layer comprising a binder containing fluorine has a low refractive index and the refractive index is more reduced with an increase in the fluorine content. Also, when the fluorine content in the coating layer is increased, such an effect that the coating layer is resistant to the sticking of soils, improving anti-stain characteristics is produced. However, because the intermolecular force of fluorine itself is small, a molecule containing a fluorine atom tends to be softened, posing the problem that if the fluorine content in a coating layer is high, the hardness and strength of the coating layer are decreased.

Because many low-refractive index layers are principally formed on the outermost surface or in the vicinity of the surface of an anti-reflecting layer, these layers basically tend to be suffered from the attacks of some materials by a contact to these materials, or collision or friction with these materials. If the fluorine content is too increased to raise the refractive index of the coating layer, this brings about a remarkable drop in hardness, so that the layer is easily damaged and there is therefore the case where the layer is damaged even if it is only rubbed hardly to wipe dusts and stains.

Also, when the low-refractive index layer is disposed as an intermediate layer though it is disposed in the vicinity of the surface, it is somewhat less damaged by attacks from the outside. However, if the fluorine content is too increased to raise the refractive index of the coating layer, this causes a reduction in strength, with the result that peeling at the interface between the low-refractive index layer and a layer adjacent to the low-refractive index layer is easily caused by the concentration of stress.

A low-refractive index layer is formed by mixing a binder having a high fluorine content with a binder containing no fluorine and having high hardness or strength, whereby the hardness and strength of the low-refractive index layer can be improved. In this case, however, the proportion occupied by fluorine to be contained in the whole of the low-refractive index layer is low and therefore the effect of the fluorine-containing binder on a reduction in refractive index is impaired, bringing about the results that the refractive index can be insufficiently reduced.

Disclosed in the publication of JP-A No. 11-64601 is a low-refractive index layer having a very fine porous structure prepared by forming micro voids having an average diameter of 200 μm or less in a coating layer comprising of a fluorine-containing polymer. The low-refractive index layer disclosed in this publication ensures that the refractive index of the coating layer can be made to be close to that of air (namely, refractive index: 1) by forming a large number of micro voids in the coating layer and it is therefore possible to reduce the refractive index even if the fluorine content in the fluorine-containing polymer is not raised. Also in this case, however, if the number of micro voids is too increased to reduce the refractive index of the coating layer, this causes reduction in the hardness and strength of the coating layer similarly to the case of raising the fluorine content.

The present invention has been attained in view of the above situation, and a first object of the present invention is to provide a coating composition capable of forming a fluorine-containing coating layer which has a low refractive index, high hardness and high adhesion.

Also, a second object of the present invention is to provide a coating layer having a low refractive index, high hardness, high adhesiveness, high transparency and is also superior in mass-productivity as the coating layer can be formed by a coating method, by using the coating composition which can attain the above first object.

Also, a third object of the present invention is to provide a coating layer used preferably as an optical thin layer which has a low-refractive index, high hardness, high adhesion and high transparency, is superior in mass-productivity and of which a low refractive index is demanded, particularly, as a low-refractive index layer of an anti-reflecting layer, by using the coating composition capable of attaining the above first object.

Also, a fourth object of the present invention is to provide an anti-reflecting layer having an optical thin layer comprising the coating layer which can attain the above second and third objects and an anti-reflecting film and an image display device to which such an anti-reflecting layer is applied.

The present invention attains at least one of these objects.

SUMMARY OF THE INVENTION

A first coating composition according to the present invention with the intention of solving the above problem is a coating composition comprising at least;

(A) a binder system which comprises one or two or more binder components containing a fluorine-containing component (a) having one or both of a functional group which can be cured by ionizing radiation and a polar group which can be heat-cured in its molecule, and contains both an ionizing radiation-curable functional group and a heatcurable polar group as a whole; and (B) an inorganic superfine particle of the order of submicron in size which can be dispersed in a colloidal state in a liquid medium for preparing a coating liquid.

A second coating composition according to the present invention is a coating composition, wherein the inorganic superfine particles (B) of the order of submicron in size are dispersed in a colloidal state in the liquid medium, the liquid medium being a solvent dissolving or dispersing the binder system (A) therein or the binder system (A) itself in a liquid state, in which the liquid medium comprises of one or two or more binder components containing a fluorine-containing component (a) having one or both of a functional group which can be cured by ionizing radiation and a polar group which can be heat-cured in its molecule, and contains both an ionizing radiation-curable functional group and a heatcurable polar group as a whole in a solvent.

By adjusting the coating composition according to the present invention to a final concentration enabling coating, a liquid coating composition is obtained which contains a binder system containing a fluorine-containing component (a) primarily and both an ionizing radiation-curable functional group and a heatcurable polar group as a whole and in which an inorganic superfine particle (B) is dispersed in a colloidal state.

Because a fluorine-containing binder is a material having a low refractive index, a coating layer having a low refractive index can be formed. However, a coating layer comprised of the fluorine-containing binder tends to have insufficient hardness and strength because it contains a fluorine atom having a small interatomic force. On the contrary, when forming a coating layer by using the coating composition of the present invention, the coating layer can be cured by irradiation with ionizing radiation and in addition, is tightened by the coagulating force and hardness of the inorganic superfine particle dispersed in a colloidal state in the cured fluorine-containing binder and it is therefore possible to avoid a significant reduction in the hardness and strength of the coating layer even when the fluorine content in the binder component is increased much.

Also, the inorganic superfine particle capable of dispersing in a colloidal state in the coating composition of the present invention produces the effect of tightening a coating layer sufficiently in such a small amount as to exert no influence at all or a little influence on the refractive index-reducing action and layer-forming characteristics of the fluorine-containing component, and it is unnecessary to formulate the inorganic superfine particle in such an amount as to raise refractive index and to make the layer fragile. Since the inorganic superfine particle has a size of the order of submicron, it has a high effect on transparency.

Further, since the binder system of the coating composition of the present invention contains a heatcurable polar group, a coating layer formed by using the coating composition of the present invention has high adhesion to the surface to be coated by the action of the heatcurable polar group as a polar group. Also, when the coating layer is heat-cured, crosslinked density can be raised and also the hardness and strength of the coating layer can be improved by two curing reactions including an ionizing radiation-curing reaction and heat-curing reaction.

Therefore, a coating layer is obtained which has large fluorine content, has a significantly low refractive index, possesses hardness and strength enough to fit for practical use and is superior in adhesion and transparency by using the coating composition according to the present invention.

Also, according to the present invention, the aforementioned coating layer can be produced by a coating method using the above coating composition and the present invention is therefore superior in the mass-productivity of a coating layer.

In the present invention, other binder components are properly combined with the fluorine-containing component (a) according to the need to make up a curing reaction group.

In the case of using the fluorine-containing component (a) having an ionizing radiation-curable functional group, a binder component having at least a heatcurable polar group in its molecule is combined. Also, in the case of using the fluorine-containing component (a) having a heatcurable polar group, a binder component having at least an ionizing radiation-curable functional group in its molecule is combined.

The fluorine-containing component (a) is preferably a fluorine-containing component (a') having a combination of an ionizing radiation-curable functional group and a heat-curable polar group. Other binder components to be combined with the fluorine-containing component (a) preferably have a combination of an ionizing radiation-curable functional group and a heat-curable polar group.

It is preferable to use a combination of the fluorine-containing component (a) and a polyfunctional (meth) acrylate to raise the crosslinked density of the coating layer. Also, in order to reduce the refractive index of the coating layer, other binder components may preferably have a fluorine atom.

The heatcurable polar group of the fluorine-containing component (a) which is an essential binder component in the present invention is preferably a hydrogen bond-forming group. In the case where this heatcurable polar group is a hydrogen bond-forming group, not only the adhesion to the coating layer but also the affinity to the inorganic superfine particle (B) is improved, and therefore the colloidal dispersion of the inorganic superfine particle (B) can be improved.

Also, the heatcurable polar group is particularly preferably a hydroxyl group among hydrogen bond-forming groups. In the case where the heatcurable polar group is a hydroxyl group, a functional group having high affinity to the inorganic superfine particle can be easily introduced and at the same time, a crosslinking point is easily introduced by treating under heating or in the presence of a proper hardener.

In order to reduce the refractive index of the coating layer sufficiently, the refractive index of the fluorine-containing component is preferably 1.45 or less, or 5 mol % or more of hydrogens bonded to carbons of all binder component contained in the binder system is preferably substituted with fluorine atoms.

The primary particle diameter of the inorganic superfine particle (B) is preferably in a range from 1 nm to 500 nm to impart high transparency to the coating layer.

Also, the refractive index of the inorganic superfine particle (B) is preferably 1.60 or less to avoid such evils that the concentration of the fluorine-containing component is diluted by compounding the inorganic superfine particle, which adversely affects a refractive index-reducing action.

As specific materials of the inorganic superfine particle (B), at least one fine particle selected from silica, alumina, magnesium fluoride and calcium fluoride is preferably used.

Hydrophobic treatment of the surface of the inorganic superfine particle (B) can improve the dispersibility of the inorganic superfine particle in a solvent or a liquid monomer and/or oligomer and makes the inorganic superfine particle (B) disperse easily in a colloidal state, and is therefore desirable.

The inorganic superfine particle (B) preferably has a polymerizable functional group on the surface thereof. Covalent bonds between the binder component and the inorganic superfine particle (B) and the hardness and strength of the coating layer can be improved intentionally by imparting a polymerizable functional group to the surface of the inorganic superfine particle (B). The polymerizable functional group of the inorganic superfine particle (B) may be generally an ionizing radiation-curable group and/or a heat-curable polar group which are the same groups as those contained in the binder component to be combined with the inorganic superfine particle (B).

In order to allow the inorganic superfine particle (B) to develop sufficient curing reactivity, an introduced part having a polymerizable functional group is preferably present in a proportion of 1 or more parts by weight per 100 parts by weight of the particle part of the inorganic superfine particle (B) Also, the number average molecular weight of the introduced part having a polymerizable functional group present on the surface of the inorganic superfine particle (B) is preferably in a range from 300 to 20000.

The inorganic superfine particle (B) is usually preferably used in an amount ranging from 0.1 to 70% by weight on a solid basis. However, in the case where the inorganic superfine particle (B) has a polymerizable functional group, the inorganic superfine particle (B) may be compounded in an amount ranging from 0.1 to 99.5% by weight based on the total solid of the coating composition. In the case where the inorganic superfine particle (B) has a polymerizable functional group, not only the binder component but also the inorganic superfine particle forms a covalent bond. Therefore, the coating layer is scarcely made fragile even if the inorganic superfine particle is compounded in a large amount and it is therefore possible to maintain layer-forming characteristics.

The coating layer according to the present invention is obtained by applying the above coating composition to a surface of an object for coating process, followed by curing, and has a structure in which the inorganic superfine particle of the order of submicron in size is dispersed in the fluorine-containing binder cured by a crosslinking bond.

As it is clear from the aforementioned, this coating layer has a very low refractive index, possesses hardness and strength enough to fit for practical use and is superior in adhesion, transparency and also mass-productivity. This coating layer is preferably used as optical thin layers of which a low refractive index is demanded, particularly as a low-refractive index layer of an anti-reflecting layer.

When the fluorine-containing binder constituting the coating layer is cured by a crosslinking bond, various material qualities such as layer hardness, layer strength and durability are improved, which is desirable. When the inorganic superfine particle and the fluorine-containing binder in the coating layer are covalent-bonded, particularly, crosslinked by a curing reaction, various material qualities such as layer hardness, layer strength and durability are more improved, which is desirable.

According to the present invention, a coating layer having satisfactory hardness and strength is obtained while it has a refractive index of 1.45 or less.

Further, according to the present invention, when forming a coating layer of 0.05 to 0.3 μm in layer thickness, it is possible to adjust the refractive index to 1.45 or less and to control the haze value of a substrate with the coating layer, in which the haze value is prescribed in JIS-K7361-1, to a value equal to the haze value of only the substrate or to limit the difference between the both within 0.1%.

Also, according to the present invention, when forming a coating layer of 0.05 to 0.3 μm in layer thickness, the refractive index can be adjusted to 1.45 or less and also, a coating layer having the characteristics that the load at which a change in haze is found when the surface of the layer is rubbed 20 times using steel wool No. #0000 is 1 Kg or more can be formed.

Also, according to the present invention, when forming a coating layer of 0.05 to 0.3 μm in layer thickness, the refractive index can be made to be 1.45 or less, a change in haze before and after the surface of the layer is rubbed 20 times using steel wool No. #0000 at a load of 200 g can be limited to 5% or less and therefore a coating layer having a very low refractive index, high transparency and a hardness and strength enough to fit for practical use can be obtained.

In addition, an anti-reflecting layer containing the coating layer according to the present invention is preferably applied to display surfaces of liquid crystal display devices, CRTs and the like.

Figure 1:
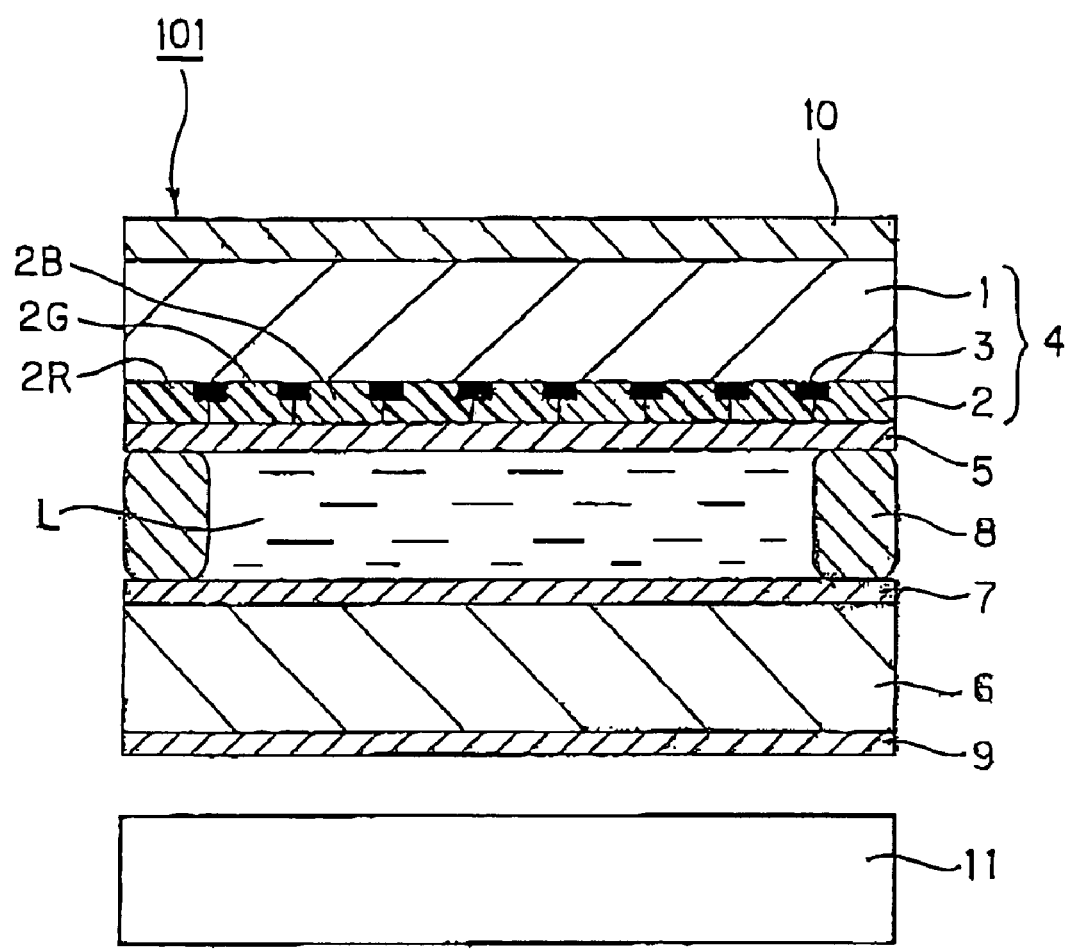
FIG. 1 is a view typically showing the section of an example of a liquid crystal display device in which the display surface is coated with a multilayer type anti-reflecting layer containing a coating layer according to the present invention.

The meanings of the symbols in each figure are as follows.

Liquid crystal display (101); Anti-reflecting film (102); Glass substrate on the display surface side (1); Pixel section (2); Black matrix layer (3); Color filter (4); Transparent electrode layer (5, 7); Glass substrate on the backside (6); Seal material (8); Orientation layer (9); Polarizing film (10); Back light unit (11); Polarizing element (12); Protect film (13, 14); Adhesive layer (15); Hardcoat layer (16); Multilayer type anti-reflecting layer (17); Middle-refractive index layer (18); High-refractive index layer (19); Low-refractive index layer (20); Substrate film (21); High-refractive index layer (22); Low-refractive index layer (23)

PREFERRED EMBODIMENTS OF THE INVENTION

The present invention will be hereinbelow explained in detail. The definitions of main terms which are referred to in the specification are as follows.

Specifically, the term "(meth) acryl" designates acryl and methacryl, the term "(meth) acrylate" designates acrylate and methacrylate and the term "(meth)acryloyl" designates acryloyl and methacryloyl.

The term "binder system" means a material system which imparts layer-forming characteristics and a solid form to a coating layer and functions as a matrix which embraces and supports other components contained in the coating layer. The binder system is constituted of single or plural binder components and may contain other components such as a polymerization initiator and dispersant according to the need. When binder components in the binder system is fixed to the surface to be coated through the solidification of the binder components associated with no chemical reaction or through the curing of the binder components associated with a chemical reaction, the binder system becomes a binder, whereby a layer is formed.

The term "binder component" is a component which can be solidified accompanied by no chemical reaction or be cured accompanied by a chemical reaction. When the binder component is fixed to the surface to be coated by such solidification or curing, it is made into a layer. When the binder components are fixed to each other, a molded body is obtained. A monomer or an oligomer having a relatively low molecular weight cannot function as a binder if it has no curing reactivity. However, a polymer or an oligomer having a relatively high molecular weight is made into a layer by drying or solidifying under cooling and can function as a binder even if it has no curing reactivity.

The term "fluorine-containing component" means a binder component having a fluorine atom in its molecule. The fluorine-containing component is not limited to the fluorine-containing component (a) which will be explained later. For example, even a binder component having no curing reactive group such as an ionizing radiation-curable functional group and a heatcurable polar group at all and therefore having no curing reactivity falls under a category of the fluorine-containing component as far as it contains a fluorine atom in its molecule.

On the other hand, the term "fluorine-non-containing component" means a binder component which has no fluorine atom at all in its molecule and may have curing reactivity or not.

Also, the term "curing reactivity" means chemical reactivity causing a curing phenomenon of a binder.

Based on the above definitions, first a coating composition according to the present invention will be explained.

A first coating composition according to the present invention is a coating composition comprising at least:

(A) a binder system which comprises one or two or more binder components containing a fluorine-containing component (a) having one or both of a functional group which can be cured by ionizing radiation (hereinafter referred to as "ionizing radiation-curable group") and a polar group which can be heat-cured (hereinafter referred to as "heatcurable polar group"), and contains both ionizing radiation-curable group and heatcurable polar group as a whole; and (B) an inorganic superfine particle of the order of submicron in size which can be dispersed in a colloidal state in a liquid medium for preparing a coating liquid.

A second coating composition according to the present invention is a liquid state of the first coating composition applicable for coating, and is a coating composition, wherein the inorganic superfine particles (B) of the order of submicron in size are dispersed in a colloidal state in the liquid medium, the liquid medium being a solvent dissolving or dispersing the binder system (A) therein or the binder system (A) itself in a liquid state, in which the liquid medium comprises of one or two or more binder components containing a fluorine-containing component (a) having one or both of a functional group which can be cured by ionizing radiation and a polar group which can be heat-cured in its molecule, and contains both an ionizing radiation-curable functional group and a heatcurable polar group as a whole in a solvent.

When a coating liquid of the coating composition is applied to a surface of an object for coating process, dried and irradiated with ionizing radiation, chemical bonds such as a crosslinking bond are formed in the coating layer, making it possible to cure the coating layer since the binder system in the coating composition has a functional group cured by ionizing radiation. Therefore, a reduction in hardness and strength caused by fluorine can be prevented.

Also, this binder system has a polar group and the coating layer formed using the coating liquid of the coating composition therefore has high adhesion to a support. Further, because the polar group of this binder system also possesses heat-curability, it has not only the effect of improving the adhesion of the coating layer by the action of the polar group as a polar group but also the effect of curing the coating layer by forming chemical bonds such as a crosslinking bond by the action of the polar group as a heatcurable group. Therefore, when the coating layer formed of the coating composition is heat-cured, high crosslinking density is obtained by two curing reactions including ionizing radiation curing and heat curing and it is therefore possible to more improve layer hardness. In the case where the binder component constituting the binder system is a polymer chain of two or more monomer units, the substitution of the ionizing radiation-curable functional group or heatcurable polar group may be made at the terminal of the principal chain, directly in the middle of the principal chain or on the side chain branched from the principal chain.

The fluorine-containing component (a) to be compounded in the coating composition of the present invention is an essential binder component used to impart layer-forming characteristics (layer-forming ability) and a low refractive index to the coating composition.

The fluorine-containing component (a) not only is a fluorine-containing component which merely has the ability of reducing the refractive index of the coating layer but also has an ionizing radiation-curable group and exhibits the ability to prevent a reduction in the hardness and strength of the coating layer or has a heatcurable polar group and exhibits the ability to improve the adhesion to the surface to be coated, whereby the material qualities of the coating layer containing fluorine can be improved.

In the case where the fluorine-containing component (a), which causes the hardness and strength of the coating layer to drop, itself is cured in the binder system by ionizing radiation, it has a high effect on improvements in the hardness and strength of the coating layer and therefore, the fluorine-containing component (a) preferably has at least an ionizing radiation-curable group.

It is only required for the fluorine-containing component (a) to have either an ionizing radiation-curable group or a heatcurable polar group. However, it is necessary for the binder system as a whole to contain both an ionizing radiation-curable group and a heatcurable polar group to thereby exhibit both the ability to inhibit a reduction in the hardness and strength of the coating layer which reduction is caused by fluorine and the ability to improve adhesion to the surface to be coated. For this, other binder components are combined with the fluorine-containing component (a) appropriately as required to make up the curing reactive group.

For instance, in the case where the fluorine-containing component (a) has only an ionizing radiation-curable group or in the case where the fluorine-containing component (a) has an ionizing radiation-curable group and a heatcurable polar group but the heatcurable polar group is contained in a small amount, the heatcurable polar group is supplied to the binder system by combining binder components having at least a heatcurable polar group in their molecules.

On the contrary, in the case where the fluorine-containing component (a) has only a heatcurable polar group or in the case where the fluorine-containing component (a) has an ionizing radiation-curable group and a heatcurable polar group but the ionizing radiation-curable group is contained in a small amount, the ionizing radiation-curable group is supplied to the binder system by combining binder components having an ionizing radiation-curable group in their molecules.

In the case of combining two or more binder components, two or more of the fluorine-containing component (a) or other binder components may be used.

In the case where the fluorine-containing component (a) is a fluorine-containing component having both an ionizing radiation-curable group and a heatcurable polar group (hereinafter referred to as "fluorine-containing component (a')", this is preferable because an ionizing radiation-curable group and a heatcurable polar group can be supplied to the binder system even if other binder components are not combined. In this case, however, other binder components having one or both of the ionizing radiation-curable group and the heatcurable polar group may also be combined to make up for the deficiency when one or both of the ionizing radiation-curable group and the heatcurable polar group are deficient.

In all of these cases, the aforementioned other binder components to be combined with the fluorine-containing component (a) are preferably binder components having both an ionizing radiation-curable group and a heatcurable polar group. Particularly, in the case where the fluorine-containing component (a) has only one of the ionizing radiation-curable group and the heatcurable polar group, other binder components having both an ionizing radiation-curable group and a heatcurable polar group are combined, whereby not only the deficiency of the curing reactive group is made up but also the fluorine-containing component (a) and other binder components can be cured by ionizing radiation or heat and therefore the hardness and strength of the coating layer are more improved.

Specifically, in the case of combining the fluorine-containing component (a) having only an ionizing radiation curable group with other binder components having both an ionizing radiation-curable group and a heatcurable polar group, the fluorine-containing component (a) supplies the ionizing radiation-curable group to the binder system, the other binder components make up the deficiency of the heatcurable polar group and also, the fluorine-containing component (a) and the other binder components can be cured by ionizing radiation.

Also, in the case of combining the fluorine-containing component (a) having only a heatcurable polar group with other binder components having both an ionizing radiation-curable group and a heatcurable group, the fluorine-containing component (a) supplies the heatcurable group to the binder system, the other binder components make up the deficiency of the ionizing radiation-curable group and also, the fluorine-containing component (a) and the other binder components can be heat-cured.

Further, in the case of combining the fluorine-containing component (a) with other binder components, from the viewpoint of increasing the fluorine content in the coating composition and the coating layer, the other binder components as well as the fluorine-containing component (a) are preferably fluorine-containing components.

To state specifically, the selections or combinations of binder components as shown below are preferable.

(1) Fluorine-containing component (a') having both an ionizing radiation-curable group and a heatcurable polar group.

(2) A combination of the fluorine-containing component (a') and the fluorine-containing component (a) having at least an ionizing radiation-curable group.

(3) A combination of the fluorine-containing component (a') and the fluorine-containing component (a) having at least a heatcurable polar group.

(4) A combination of the fluorine-containing component (a') and the fluorine-containing component having both an ionizing radiation-curable group and a heatcurable polar group.

(5) A combination of the fluorine-containing component (a) having at least an ionizing radiation-curable group and the fluorine-containing component having both an ionizing radiation-curable group and a heatcurable polar group.

(6) A combination of the fluorine-containing component (a) having at least a heatcurable polar group and the fluorine-containing component having both an ionizing radiation-curable group and a heatcurable polar group.

The aforementioned selections and combinations (1) to (6) ensure that an ionizing radiation-curable group and a heatcurable polar group can be supplied to the binder system in sufficient amounts in a well-balanced manner. The above (1) to (5) are desirable in the point that the fluorine-containing component (a) itself can be cured by ionizing radiation and the above (2), (4) and (5) are desirable in the point that the fluorine-containing component (a) and the other binder components can be cured by ionizing radiation. Further, the above (2) and (3) are desirable in the point that the other binder components also have a fluorine atom.

The ionizing radiation-curable group of the binder component means a functional group capable of running a macromolecule-forming reaction such as a polymerization or crosslinking reaction by irradiation with ionizing radiation. Examples of the ionizing radiation-curable group include those which can proceed with a reaction according to reaction systems such as polymerization reactions, e g., photo-radical polymerization, photo-cationic polymerization and photo-anionic polymerization and addition polymerization or condensed polymerization run through photo-dimerization. Among these groups, ethylenic unsaturated bonds such as an acryl group, vinyl group and allyl group are preferable because they run a photo-radical reaction directly or indirectly in response to the action of an initiator by irradiation with ionizing radiation such as ultraviolet rays and electron rays and therefore, handling involving a photo-curing process is relatively easy.

Also, the heatcurable polar group of the binder component means a functional group capable of running a macromolecule-forming reaction such as a polymerization or crosslinking reaction among the polar groups or between the polar group and other functional groups by heating. Among these heatcurable polar groups, hydrogen bond-forming groups such as a hydroxyl group, carboxyl group, amino group and epoxy group are preferable because they have not only high adhesion to the coating layer but also high affinity to the inorganic superfine particle (B) and therefore improve the colloidal dispersion of the inorganic superfine particle (B). Among the aforementioned heatcurable polar groups, a hydroxyl group is most preferable because it can be introduced easily in the form of, for example, a silanol (Si—OH) group which has high affinity to the inorganic superfine particle and at the same time, a crosslinking point can be easily introduced by heating or treating in the presence of a proper hardener.

The fluorine-containing component (a) and other curing reactive binder components exhibit sufficient curability by a crosslinking reaction in the case where these components have two or more ionizing radiation-curable groups and/or one or more heatcurable polar groups in one molecule and therefore such a case is preferable.

As the fluorine-containing component (a), monomers, oligomers and polymers or mixtures obtained by arbitrarily combining these compounds may be selected among fluorine-containing compounds having one or both of an ionizing radiation-curable group and a heatcurable polar group together with a fluorine atom in the molecular structure and used.

Fluorine-containing monomers and oligomers having an ionizing radiation-curable group among the fluorine-containing components (a) have a high effect on the improvement of the crosslinking density of the coating layer and also the effect of improving the coating aptitude of a coating composition because they have a small molecular weight and therefore have high fluidity.

Moreover, in the case where as the fluorine-containing components (a), a liquid fluorine-containing monomer and oligomer are used relatively in a large amount, the above fluorine-containing monomer and oligomer function as a diluent. Even if no solvent is used, it is possible to dissolve or disperse other ingredients and also to disperse the inorganic superfine particle in a colloidal state and it is also possible to prepare a liquid coating composition containing no solvent.

On the other hand, a fluorine-containing polymer among the fluorine-containing components (a) already has a large molecular weight and therefore has higher layer-forming characteristics than a fluorine-containing monomer and/or oligomer. When the aforementioned fluorine-containing monomer and oligomer are combined with this fluorine-containing polymer, the coating aptitude can be bettered because the fluidity is improved and also the hardness and strength of the coating layer can be improved because the crosslinking density is improved.

As the fluorine-containing component (a) having only an ionizing radiation-curable group, fluorine-containing monomers having an ethylenic unsaturated bond can be widely used. More specific examples of the fluorine-containing component (a) having only an ionizing radiation-curable group may include fluoroolefins (e.g., fluoroethylene, vinylidene fluoride, tetrafluoroethylene, hexafluoropropylene, perfluorobutadiene and perfluoro-2,2-dimethyl-1,3-dioxole).

Examples of the fluorine-containing component (a) having only a heatcurable polar group may include 4-fluoroethylene-perfluoroalkylvinyl ether copolymers; fluoroethylene/hydrocarbon base vinyl ether copolymers; and fluorine-modified products of each resin such as epoxy, polyurethane, cellulose, phenol and polyimide resins.

As the fluorine-containing component (a') having both an ionizing radiation-curable group and a heat-curable polar group, compounds may be used which are obtained by substituting a fluorine atom for a part of a fluorine-containing monomer having a polar group which monomer will be explained later as a raw material for synthesizing polymers or oligomers belonging to the fluorine-containing component (a). Particularly, fluorine-containing compounds in which a fluorine atom is introduced into the α-position of an ethylenic unsaturated bond are preferably used because these compounds are superior in lowering of refractive index and strengthening of the coating layer.

For example, a 1,1,2-trifluoroallyloxy monomer represented by the following formula 1 is preferably used as the fluorine-containing monomer having both an ionizing radiation-curable group and a heatcurable polar group.

Formula 1

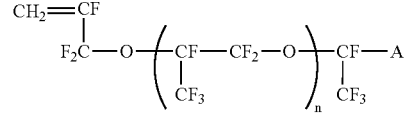

wherein -A represents —CH$_2$OH, —COOCH$_3$, —CN or —COOH, wherein when -A is —CH$_2$OH, the monomer is superior in solubility and soluble in solvents such as acetone, acetic acid and tetrahydrofuran (THF), which is desirable, and "n" denotes an integer and preferably an integer ranging from 1 to 3.

Other than above, examples of the fluorine-containing component (a') having both an ionizing radiation-curable group and a heatcurable polar group may include partly or completely fluorinated alkyl, alkenyl or aryl esters of acryl or methacrylic acid (e.g., compounds represented by the following formulae 2 or 3);

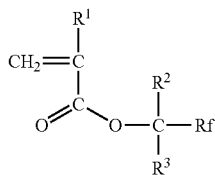

Formula 2 wherein $R^1$ represents a hydrogen atom, an alkyl group having 1 to 3 carbon atoms or a halogen atom, Rf represents a partly or completely fluorinated alkyl group, alkenyl group, hetero ring or allyl group, $R^2$ and $R^3$ respectively represent a hydrogen atom, an alkyl group, an alkenyl group, a hetero ring and an aryl group or a group defined by the Rf, wherein $R^1$, $R^2$, $R^3$ and Rf may respectively have a substituent other than a fluorine atom and optional two or more groups among $R^2$, $R^3$ and Rf may be combined to form a cyclic structure.

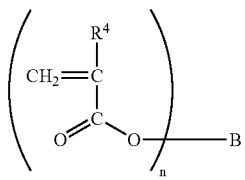

Formula 3 wherein B represents a completely or partly fluorinated organic group having "n" valences, $R^4$ represents a hydrogen atom, an alkyl group having 1 to 3 carbon atoms or a halogen atom provided that $R^4$ may have a substituent other than a fluorine atom and "n" denotes an integer from 2 to 8; completely or partly fluorinated vinyl ethers, completely or partly fluorinated vinyl esters and completely or partly fluorinated vinyl ketones.

The oligomer and polymer to be used as the fluorine-containing component (a) are obtained as follows. First, a monomer or oligomer belonging to the fluorine-containing component (a') having both an ionizing radiation-curable group and a heatcurable polar group and particularly preferably, a monomer or oligomer, such as the aforementioned 1,1,2-trifluoroallyloxy monomer, having only one ionizing radiation-curable group such as an ethylenic unsaturated bond is polymerized to synthesize an intermediate polymer containing a fluorine atom and also having a pendant structure containing a polar group. The intermediate polymer may be a copolymer of a monomer or oligomer belonging to the fluorine-containing component (a) and a monomer or oligomer which does not belong to the fluorine-containing component (a). A similar intermediate polymer can be obtained by copolymerizing a fluorine-containing monomer having only an ionizing radiation-curable group with a fluorine-non-containing monomer having both an ionizing radiation curable group and polar group.

Here, examples of the fluorine-non-containing monomer having both an ionizing radiation-curable group and a polar group may include epoxy(meth)acrylates, glycidyl(meth)acrylates, glycerol mono(meth)acrylates, glycerol di(meth)acrylates, 2-hydroxyethyl(meth)acrylate and its caprolactam-modified products, 2-hydroxypropyl(meth)acrylate and its caprolactam-modified products, phosphoric acid (meth)acrylates, polyethylene glycol(meth)acrylates, polypropylene glycol(meth)acrylates, (meth)acrylates of polyethylene glycol/polypropylene glycol copolymers, succinic acid acrylates and acrylamide.

Then, a compound having a functional group which can be condensation-polymerized or addition-polymerized with a polar group of the aforementioned intermediate polymer and an ionizing radiation-curable group such as an ethylenic unsaturated bond is reacted and as a result, the ionizing radiation-curable group is introduced through a part of the polar group of the intermediate polymer to synthesize an oligomer or a polymer having both an ionizing radiation-curable group and a polar group and belonging to the fluorine-containing component (a'). The functional group which can be condensation-polymerized or addition-polymerized with the polar group of the intermediate polymer may be optionally selected from among the examples given as the polar group of the intermediate polymer. In the case where a residual part to be introduced together with the ionizing radiation-curable group into the intermediate polymer is substituted with a fluorine atom, this is preferable because the refractive index of the resulting oligomer or polymer is more reduced.

When the ratio of the amounts of the ionizing radiation-curable group and polar group contained in the oligomer or polymer, which is the fluorine-containing component (a'), (ionizing radiation-curable group: polar group) is in a range from 20 mol %: 80 mol % to 90 mol %: 10 mol %, this is preferable because the balance between ionizing radiation-curability and adhesion to the support is maintained.

In the present invention, the fluorine-containing component (a) is used as the essential binder component and also, other binder components may be used together with the fluorine-containing component (a) according to the need. In order to control various qualities, for example, to improve the hardness, strength and adhesion of the coating layer and to adjust the refractive index to a predetermined one, a binder component containing no fluorine may be used without departing from the object of the present invention. As other binder components, a non-reactive fluorine-non-containing oligomer and polymer, non-reactive fluorine-containing oligomer and polymer and curing reactive fluorine-non-containing monomer, oligomer and polymer may be used optionally.

Examples of the non-reactive fluorine-containing oligomer and polymer may include transparent resins, which are conventionally used to form optical thin layers, for example, non-curing reactive polymers having no polymerizable functional group such as a polyacrylic acid, polymethacrylic acid, polyacrylate, polymethacrylate, polyolefin, polystyrol, polyamide, polyimide, polyvinyl chloride, polyvinyl alcohol, polyvinylbutyral and polycarbonate.

Examples of the non-reactive fluorine-containing oligomer or polymer may include a polytetrafluoroethylene; 4-fluoroethylene-6-fluoropropylene copolymer; 4-fluoroethylene-ethylene copolymer; polyvinyl fluoride; polyvinylidene fluoride; and fluorine-modified silicone resin.

Also, examples of the curing reactive fluorine-non-containing monomer, oligomer and polymer may include monomer and oligomers having a polymerizable functional group such as an ethylenic unsaturated bond, for example, monofunctional (meth)acrylates such as 2-hydroxyethyl(meth) acrylate, 2-hydroxypropyl(meth)acrylate, hydroxybutylacrylate, 2-hydroxy3-phenoxypropylacrylate, carboxypolycaprolactonacrylate, acrylic acid, methacrylic acid and acrylamide; diacrylates such as ethylene glycol diacrylate and pentaerythritol diacrylate monostearate; tri (meth)acrylates such as trimethylolpropanetriacrylate and pentaerythritoltriacrylate, polyfunctional (meth)acrylates such as pentaerythritoltetraacrylate derivatives and dipentaerythritolpentaacrylate and oligomers obtained by polymerizing these radical polymerizable monomers. Also, curing reactive polymers obtained by introducing a polymerizable functional group such as an ethylenic unsaturated bond into the aforementioned non-curing reactive polymers may be exemplified. Moreover, fluorine-non-containing monomers having both an ionizing radiation-curable group and a polar group such as those exemplified as raw materials for producing the intermediate polymer of the fluorine-containing component (a') may also be used.

The other binder components preferably have an ionizing radiation-curable group, particularly, an ethylenic unsaturated bond, capable of forming a crosslinking bond between itself and the fluorine-containing component (a). Also, the monomer which is the other binder component preferably has two or more ionizing radiation-curable groups such as ethylenic unsaturated bond. Among these compounds, polyfunctional (meth) acrylates are preferable. Furthermore, the other binder components preferably have a fluorine atom to reduce the refractive index of the coating layer.

Also, the coating composition of the present invention may be formulated with a fluorine-non-containing monomer and/or oligomer having an SP value of 8.5 to 12 calculated based on the logistic equation of SP value which is proposed by Fedros to improve the compatibility between the fluorine-containing component and the inorganic superfine particle. Even if the inorganic superfine particle is sufficiently dispersed in a transparent state when it is in the state of a coating liquid, there is the case where the inorganic superfine particle is coagulated and whitened during the course of drying the coating layer. In the coating composition of the present invention, on the other hand, a fluorine-containing monomer and/or oligomer which have high affinity to both the fluorine-containing component and the inorganic superfine particle are compounded, whereby the whitening of the coating layer can be prevented.

Here, specific examples of the fluorine-non-containing monomer and/or oligomer having a di- or more-functional ethylenic unsaturated bond and an SP value of 8.5 to 12 may include monofunctional (meth) acrylates such as acrylic acid, methacrylic acid and acrylamide; diacrylates such as pentaerythritol triacrylate, ethylene glycol diacrylate and pentaerythritol diacrylate monostearate; tri(meth)acrylates such as trimethylolpropanetriacrylate and pentaerythritoltriacrylate, polyfunctional (meth)acrylates such as pentaerythritoltetraacrylate derivatives and dipentaerythritolpentaacrylate and oligomers obtained by polymerizing these polymerizable monomers. These fluorine-non-containing monomers and/or oligomers may be used in combinations of two or more.

In order to apply the coating composition according to the present invention evenly to a large area, a ketone base solvent or a mixed solvent containing a ketone base solvent is preferably used. The ketone base solvent and also the mixed solvent respectively have an SP value falling in a range from 8.5 to 12. Therefore, in the case of using a fluorine-non-containing monomer or oligomer having an SP value falling in this range, the compatibility of the fluorine-containing component with the inorganic superfine particle is improved and at the same time, there is such an effect that the solubility of the coating composition in a solvent and a coating aptitude are improved.

The fluorine-non-containing monomer and/or oligomer for improving the compatibility between the fluorine-containing component and the inorganic superfine particle are usually compounded in a proportion of about 0.1 to 70% by weight based on the total amount of solids of the coating composition of the present invention.

The aforementioned monomer, oligomer and polymer which belong to the fluorine-containing component (a) and the aforementioned monomer, oligomer and polymer which do not belong to the fluorine-containing component (a) may be combined appropriately to be able to control various properties such as layer-forming characteristics, coating aptitude, crosslinking density of ionizing radiation curing, fluorine content and the content of a polar group having heat-curability. For example, crosslinking density and processing aptitude are improved by the monomer and oligomer and the layer-forming characteristics of the coating composition are improved by the polymer.

In the present invention, the various properties of the coating layer can be controlled by appropriately combining a monomer having a number average molecular weight of 2,000 or less (polystyrene-converted number average molecular weight measured by gel permeation chromatography (GPC)), an oligomer having a number average molecular weight of 2,000 to 10,000 and a polymer having a number average molecular weight of 10,000 to 200,000 and further, as required, by combining a binder component other than the fluorine-containing component (a).

Particularly, a combination of a polymer having a number average molecular weight of 10,000 to 200,000 and belonging to the fluorine-containing component (a) and a polyfunctional (meth)acrylate having two or more ethylenic unsaturated bonds is desirable because the balance among various characteristics including coating characteristics, layer-forming characteristics, layer hardness and layer strength is easily acquired.

In the present invention, the amount of fluorine contained in the whole binder component is determined from the amount of fluorine contained in the fluorine-containing component (a) and fluorine-containing components other than the fluorine-containing component (a) which are compounded in the coating composition. The refractive index of the resulting coating layer can be regulated by controlling the fluorine content of the binder component primarily containing the fluorine-containing component (A). Specifically, the higher the content or the amount of fluorine in the fluorine-containing component (a) and other fluorine-containing components which are compounded in the coating composition is, the higher the fluorine content in the coating composition and in the coating layer formed using the coating composition is and the lower the refractive index is. On the other hand, the lower the content or the amount of fluorine in the fluorine-containing component (a) and other fluorine-containing components which are compounded in the coating composition is, the lower the fluorine content in the coating composition and in the coating layer formed using the coating composition is and the higher the refractive index is.

In order to reduce the refractive index of the coating layer satisfactorily, the refractive index of the fluorine-containing component (a) is made to be 1.45 or less and particularly 1.42 or less and also the refractive index of fluorine-containing components other than the fluorine-containing component (A) is made to be preferably 1.45 or less and particularly 1.42 or less. Also, as to the fluorine content, 5 mol % or more and particularly 20 mol % or more of hydrogens bonded to carbons of the whole binder component containing the fluorine-containing component (a) primarily is preferably substituted with fluorine atoms.

However, if the fluorine content in the binder component is too high, the hardness and strength of the coating layer formed from the coating composition containing the binder component drop, giving rise to the problem that the resulting coating layer cannot fit for practical use as an optical thin layer such as a low-refractive index layer. Conventionally, when the refractive index of a fluorine-containing component is about 1.42 or less, the fluorine content becomes too large, offering a difficulty in obtaining a coating layer having sufficient hardness and strength.

In the present invention, on the contrary, the inorganic superfine particle is compounded in the binder component primarily containing the fluorine-containing component (a) as will be explained later. This makes it possible to form a coating layer having a hardness and strength enough to fit for practical use even when using a coating composition in which 20 mol % or more of hydrogen atoms bonded to carbons constituting the molecules of the whole binder component therein are substituted with fluorine atoms or when using a fluorine-containing component having a refractive index of 1.42 or less. The fluorine substitution ratio of the fluorine-containing component may be measured by an NMR method or an elemental analysis method.

The inorganic superfine particle (B) to be compounded in the coating composition of the present invention is a component imparting a hardness and strength enough to fit for practical use to the coating layer formed from a binder obtained by curing the binder system (A) having a high fluorine content.

Specifically, a coating liquid prepared by dispersing the inorganic superfine particle in a colloidal state in the binder system (A) primarily containing the fluorine-containing component (a) is applied to a surface of an object for coating process, solidified by a method such as drying and then further cured by ionizing radiation to obtain a coating layer in which the inorganic superfine particle is evenly dispersed in the binder comprising of the cured product of the above binder system (A). This coating layer is made tight by the aid of the coagulation force of the evenly dispersed inorganic superfine particle and the hardness of the particle itself. Therefore, even when raising the fluorine content in the binder component to drop the refractive index, a significant reduction in the hardness and strength of the coating layer can be avoided, allowing the coating layer to have a hardness and strength enough to fit for practical use.

The inorganic superfine particle (B) capable of being dispersed in a colloidal state in the coating composition of the present invention sufficiently produces the effect of tightening the coating layer in such a small amount as to give no influence at all or to give a little influence on the ability of reducing the refractive index of the fluorine-containing component (a) and/or other fluorine-containing component and on the layer-forming characteristics of the composition and it is therefore unnecessary to compound the inorganic superfine particle in such an amount as to raise the refractive index and to make the layer fragile.

The coating composition of the present invention is used in the following two cases: in one case, the coating composition is adjusted to the concentration used in a coating operation by using a solvent from the beginning; and in another case, the coating composition may be stored in a highly concentrated state containing no solvent at all or containing a solvent in a little amount, and a solvent is added just before using the composition to adjust to the concentration used in a coating operation. Also, there is the case where the coating composition can be prepared in the state of a coating liquid without using a solvent by using, as the fluorine-containing component, a liquid fluorine-containing monomer and/or oligomer in a relatively large amount. In any case, the inorganic superfine particle (B) must be one which can be finally dispersed evenly in a colloidal state in a coating liquid.

Therefore, the inorganic superfine particle (B) must be one which can be dispersed evenly in a colloidal state either in a solvent used for preparing the coating composition of the present invention to be a coating liquid, or in fluorine-containing monomer and/or oligomer used for preparing the coating composition of the present invention to be a coating liquid without using a solvent.

It is possible to improve the hardness and strength of the coating layer sufficiently by compounding the inorganic superfine particle only in a relatively small amount. It is therefore possible to eliminate such an adverse effect that the concentration of the fluorine-containing component is diluted by compounding the inorganic superfine particle so that the refractive index-reducing action is adversely affected or to limit the adverse effect to a small level. However, when using the inorganic superfine particle in a relatively large amount, there are a few possibilities of adversely affecting the refractive index reducing action of the fluorine-containing component and therefore one having a refractive index of 1.60 or less and particularly 1.55 or less is preferably used as the inorganic superfine particle. Examples of the inorganic superfine particle may include alumina $AL_2O_3$ (refractive index: 1.53), silica $SiO_2$ (refractive index; 1.46), magnesium fluoride $MgF_2$ (refractive index: 1.38) and calcium fluoride $CaF_2$ (refractive index: 1.36). It is preferable to use an inorganic superfine particle which is dispersible in a colloidal state in a solvent or a monomer and/or oligomer and is selected from these materials. In the case where, a particularly low refractive index is needed, it is preferable to use a colloidal silica ($SiO_2$) fine particle among the above exemplified inorganic superfine particles. Also, in the case where first priority is given to the impartation of sufficient hardness to the coating layer, it is preferable to use an alumina ($Al_2O_3$) superfine particle.

Also, as the inorganic superfine particle (B), one having a so-called superfine particle size is used to allow the coating layer to secure sufficient transparency. Here, the term "superfine particle" means particles of the order of submicron in size and those having a particle diameter smaller than particles generically called "fine particles" having a particle diameter of several μm to hundreds μm. As to the specific size of the inorganic superfine particle (B) used in the present invention, it is usually preferable to use an inorganic superfine particle having a primary particle diameter of 1 nm to 500 nm though depending on the use and grade of an optical thin layer to which the coating composition of the present invention is applied. When the primary particle diameter is less than 1 nm, it is difficult to impart sufficient hardness and strength to the coating layer whereas when the primary particle diameter exceeds 500 nm, the transparency of the coating layer is impaired and there is the case where the coating layer is not applicable depending on its use. The primary particle diameter of the inorganic superfine particle may be visually measured from an image photograph of secondary electron discharge obtained by a scanning type electron microscope (SEM) or mechanically measured by a grain distribution measuring device utilizing a dynamic light scattering method or a static light scattering method.

Among the aforementioned range of the primary particle diameter, the inorganic superfine particle (B) having a primary particle diameter of 1 to 100 nm is preferable for forming a ultra-thin optical thin layer such as a low-refractive index layer of an anti-reflecting layer and the inorganic superfine particle (B) having a primary particle diameter of 100 to 500 nm is preferable for forming a relatively thick Mos-eye structure layer among optical thin layers.

The inorganic superfine particle having a sphere shape, a needle shape or any other particle shape may be used in the present invention as far as it is dispersible in a colloidal state, can secure the hardness and strength of the coating layer and has a size of the order of submicron so as to be able to secure transparency.

If the inorganic superfine particle has a structure in which a part of the inorganic superfine particle is a metal hydroxide and water is adsorbed to hydrate the particle, this is preferable because it is easy to disperse the particle in a colloidal state in a solvent or a liquid monomer and/or oligomer.

Also, the inorganic superfine particle can be improved in dispersibility in a solvent or a liquid monomer and/or oligomer and is therefore easily dispersed in a colloidal state by processing the surface thereof by hydrophobic treatment. Many hydroxyl groups are present on the surface of the inorganic superfine particle and therefore the affinity of the inorganic superfine particle to the fluorine-containing component is not so good. Therefore, when the inorganic superfine particle is compounded in a large amount in the coating composition of the present invention, there is the case where the coagulation of the inorganic superfine particle takes place in the coating layer and the coating layer is whitened during the course of drying the coating liquid after the coating liquid is applied even though a coating liquid in which the inorganic superfine particle is sufficiently dispersed is obtained. If the inorganic superfine particle is processed by hydrophobic treatment, on the contrary, the compatibility of the inorganic superfine particle with the fluorine-containing component is improved and such an effect is obtained that this whitening phenomenon can be prevented.

The inorganic superfine particle can be provided with hydrophobic properties by coating the particle with a low-molecular organic compound. Specifically, a low-molecular organic compound is dissolved in advance in an organic solvent, the inorganic superfine particle is dissolved in the resulting liquid and then the organic solvent is completely removed by evaporation, whereby the inorganic superfine particle can be coated with the low-molecular organic compound. Examples of the low-molecular organic compound may include low-molecular organic carboxylic acids such as stearic acid, lauric acid, oleic acid, linoleic acid and linolenic acid and low-molecular organic amines.

Also, the inorganic superfine particle can be made hydrophobic by surface-treating the particle by using a coupling agent such as a silane coupling agent and titanate coupling agent. When among these coupling agents, a silane coupling agent (fluorine base silane coupling agent) containing a fluorine atom is used to processing the surface of the inorganic superfine particle by hydrophobic treatment, the inorganic superfine particle is improved in compatibility with, particularly, the fluorine-containing component, making it possible to prevent the coating layer from being whitened efficiently.

Here, specific examples of the silane coupling agent may include 3-glycidoxypropyltrimethoxysilane, 3-glycidoxypropylmethyldimethoxysilane, 2-(3,4-epoxycyclohexyl) ethyltrimethoxysilane, 3-aminopropyltriethoxysilane, 3-aminopropyltrimethoxysilane, N-(2-aminoethyl)3-aminopropylmethyldiethoxysilane, 3-mercaptopropyltrimethoxysilane, vinyltrimethoxysilane, vinyltriethoxysilane, vinyltris (2-methoxyethoxy) silane and 3-methcryloxypropyltrimethoxysilane.

In the case of treating using a silane coupling agent having a reactive group among these compounds, the heatcurable polar group of the binder component, the alkoxy group and heatcurable functional group of the silane coupling agent easily form a firm bond with each other to be able to improve the strength of the coating layer.

Specific examples of the titanate coupling agent may include PLENACT KR-TTS, KR-46B, KR-55, KR-41B, KR-38S, KR-138S, KR-238S and 338X, KR-44, KR-9SA and KR-ET (trade names) which are commercially available from AJINOMOTO CO., INC. Further, metal alkoxides such as tetramethoxytitanium, tetraethoxytitanium, tetraisopropoxytitanium, tetra-n-propoxytitanium, tetra-n-butoxytitanium, tetra-sec-butoxytitanium and tetra-tert-butoxytitanium may also be used.

Examples of the fluorine base silane coupling agent may include TSL8262, TSL8257, TSL8233 and TSL8231 (trade names) which are fluoroalkylsilane coupling agents manufactured by GE Toshiba Silicones.

Inorganic superfine particles which have been processed by hydrophobic treatment are available as commercial products. Examples of such commercially available products include products obtained by adsorbing an organic low-molecular compound to the surface of a $SiO_2$ fine particle to make the surface hydrophobic. As such commercially product, NISSAN CHEMICAL INDUSTRIES, LTD. is supplying Organo Silica Sol (trade name).

In the coating composition of the present invention, the inorganic superfine particle is preferably contained in a proportion of 0.1 to 70% by weight based on the total amount of solids containing the binder component including the fluorine-containing component (a), the inorganic superfine particle and other components and it is more preferable that the lower limit be designed to be 0.3% by weight or more and/or the upper limit be designed to be 50% by weight or less and particularly 30% by weight or less. Here, the solid content of the coating composition is all components except for a solvent and a liquid monomer and oligomer are also included in the solid content. If the proportion of the inorganic superfine particle to be compounded is excessively small, the hardness and strength of the coating layer is insufficiently improved, whereas if the proportion of the inorganic superfine particle to be compounded is excessively large, the fluorine-containing component is diluted, making it impossible to reduce the refractive index sufficiently and also the amount of the binder component in the coating composition is relatively decreased, bringing about a fragile coating layer and lowered layer strength. By making the coating composition of the present invention contain the inorganic superfine particle in an amount of 0.1 to 70% by weight on a solid basis, it is possible to improve the hardness and strength of the coating layer without adversely affecting the refractive index-reducing action of the fluorine-containing component and a coating layer having a very low refractive index and excellent hardness and strength is thereby obtained.

When the heatcurable polar group in the binder system (A) is a hydroxyl group and the surface of the inorganic superfine particle (B) is partially changed to a metal hydroxide with producing a hydroxy group, the hydroxyl groups of the binder component and inorganic superfine particle (B) undergo dehydration polymerization condensation among them to be thereby able to form a covalent bond and the hardness and strength of the coating layer are therefore improved. Even in the case where the heatcurable polar group of the binder component is not a hydroxyl group, there is the case where it can form a covalent bond in combination with the hydroxyl group on the surface of the inorganic superfine particle (B).

Also, covalent bonds between the binder components and the inorganic superfine particle (B) can be increased thereby enabling the coating layer to be improved in hardness and strength intentionally by imparting a polymerizable functional group to the surface of the inorganic superfine particle (B).

Any material may be used as the polymerizable functional group on the surface of the inorganic superfine particle (B) without any particular limitation as far as it can be polymerized with the ionizing radiation-curable group and/or heatcurable polar group contained in the binder component to form a covalent bond. As the polymerizable functional group, those having a proper reaction system in accordance with the ionizing radiation-curable group and/or a heatcurable polar group contained in the binder component to be combined with the inorganic superfine particle (B) may be used. Generally, the polymerizable functional group may be the same ionizing radiation-curable group and/or a heatcurable polar group as those contained in the binder component to be combined.

For example, the fluorine-containing component (a) containing an ethylenic unsaturated bond is combined with the inorganic superfine particle (B) likewise having an ethylenic unsaturated bond and a photo-radical initiator may be added according to the need, or the fluorine-containing component (a) having an epoxy group is combined with the inorganic superfine particle (B) having an amino group or a hydroxyl group and an epoxy reaction hardener may be added according to the need. As the polymerizable functional group on the surface of the inorganic superfine particle (B), an ionizing radiation-curable group such as an ethylenic unsaturated bond is preferably used in consideration of a method of introducing a functional group into the inorganic superfine particle (B) and handling simplicity in a curing reaction.

The methods of imparting a polymerizable functional group and preferably an ionizing radiation-curable group such as an ethylenic unsaturated bond to the surface of the inorganic superfine particle are roughly divided into the following three categories.

(1) A method in which a monomer, oligomer or polymer containing a polymerizable functional group is adsorbed to the surface of the inorganic superfine particle.

(2) A method in which a coupling agent having a polymerizable functional group is used to carry out hydrophobic treatment of the inorganic superfine particle and at the same time, a reactive functional group is introduced into the surface.

(3) A polymer having a reactive functional group is grafted on the surface of the inorganic superfine particle.

In the method (1), when adding a component containing a polymerizable functional group to a dispersion liquid of the inorganic superfine particle, for example, the component having a polar group (utilization of a hydrogen bond or static electricity and utilization of hydrophilic interaction) is selected if the surface of the inorganic superfine particle is hydrophilic, the component which is hydrophobic (utilization of hydrophobic interaction) is selected in a hydrophilic atmosphere if the surface of the inorganic superfine particle is hydrophobic and the component which is basic (utilization of acid-base interaction) is selected if the inorganic superfine particle is acidic. This can increase the amount of the component to be absorbed to the surface of the inorganic superfine particle.

In the above method (2), the polymerizable functional group can be easily introduced by running a polymerization condensation reaction between the previously exemplified coupling agent and a polar group on the surface of the inorganic superfine particle, as required, in the presence of an acidic or basic catalyst. At this time, as the coupling agent which may be used, monomers, oligomers and polymers in which an alkoxy group is introduced into the terminal or side chain thereof besides the exemplified coupling agents for the aforementioned hydrophobic treatment may be used.

The method of grafting a polymer on the surface of the inorganic superfine particle in the above method (3) is roughly divided into the following three categories.

(3a) A method in which a polymer growth terminal is captured by the inorganic superfine particle.

The hydroxyl group (—OH) existing on the surface of the inorganic superfine particle has the ability to capture active types such as radicals. A monomer, oligomer or polymer having a polymerizable functional group can be bound with the surface of the fine particle by running a polymerization reaction of a polyfunctional monomer or oligomer in the presence of the inorganic superfine particle or by adding the inorganic superfine particle to a polymerization system of a polyfunctional monomer or oligomer. When polymerization reactions such as block polymerization are run with mixing fine particles in a monomer by kneading, this is effective but binding efficiency is unsatisfactory.

(3b) Method of Initiating a Polymerization Reaction From the Surface of the Inorganic Superfine Particle This is a method in which a polymerization initiating active type such as a radical initiator is formed in advance on the surface of the inorganic superfine particle and using a polyfunctional monomer or oligomer, a polymer is grown from the surface of the fine particle. In this method, a polymerization reactive polymer chain having a high molecular weight is easily obtained but it is difficult to control chain transfer and the like.

(3c) Method of Binding a Polymer Having a Reactive Group With a Hydroxyl Group on the Surface of the Inorganic Superfine Particle Using a polymer having a di- or more-functional reactive group, the reactive group at the terminal of the polymer is bound directly with a hydroxyl group on the surface of the inorganic superfine particle or the polymer is bound with the inorganic superfine particle after other reactive group is bound with one or both of a reactive group at the terminal of the polymer or the hydroxyl group on the surface of the inorganic superfine particle. In this method, various types may be used as the polymer and good binding efficiency is obtained in a relatively simple operation.

The method of binding the polymer with the surface of the inorganic superfine particle makes use of a dehydration polymerization condensation reaction between a hydroxyl group on the surface of the particle and the polymer having a reactive group. Therefore, in this method, the inorganic superfine particle is dispersed in the polymer or its liquid and the dispersion liquid is heated at 80° C. or more for 3 hours or more.

The inorganic superfine particle (B) having a polymerizable functional group is available as commercial products. Examples of such commercial products include products with which a reactive organic group containing a reactive group such as an ethylenic unsaturated bond, hydroxyl group or amino group is bound among surface treating $SiO_2$ fine particles supplied in the name of Highlink OG (trade name) series from Clariant Corp. in France. To state more specifically, examples of products having an ethylenic unsaturated bond include those prepared by binding a hydroxyl group-containing (meth)acrylate such as 2-hydroxyethyl (meth)acrylate or 2-hydroxypropyl(meth)acrylate with a silanol group on the surface of a $SiO_2$ fine particle by an ether bond. Examples of products having a hydroxyl group include those prepared by binding a polyhydric alcohol such as ethylene glycol, propylene glycol, 1,4-butanediol, polyethylene glycol, glycerol or trimethylpropane or alkoxysilane with a silanol group on the surface of a $SiO_2$ fine particle by an ether bond. Examples of products having an amino group include those prepared by binding a hydroxyl group-containing amine with a silanol group on the surface of a $SiO_2$ fine particle by an ether bond.

The part of a monomer, oligomer or polymer structure having a polymerizable functional group can be introduced into the surface of the inorganic superfine particle in this manner. In order that the inorganic superfine particle (B) may develop sufficient curing reactivity, the part having the polymerizable functional group introduced on the surface thereof (the polymerizable functional group itself in the case where the polymerizable functional group is directly bound with the surface of the particle) preferably exists in an amount of 1 or more parts by weight per 100 parts by weight of the particle part of the inorganic superfine particle (B). The amount of the polymerizable functional group bound with the inorganic superfine particle (B) may be measured by an elemental analysis method.

Also, the part into which the polymerizable functional group is introduced and which exists on the surface of the inorganic superfine particle (B) preferably has a number average molecular weight ranging from 300 to 20000.

When the inorganic superfine particle (B) has two or more ionizing radiation-curable groups and/or one or more heat-curable polar groups, this is preferable because the particle exhibits sufficient curability by a crosslinking reaction.

When the inorganic superfine particle (B) has a polymerizable functional group, there is no particular limitation to the proportion of the inorganic superfine particle to be compounded as far as the fluorine-containing component (b) is substantially compounded in the coating composition. However, the proportion of the inorganic superfine particle (B) may be adjusted within a wide range from 0.1 to 99.5% by weight based on the total amount of solids containing the binder system containing the fluorine-containing component, the inorganic superfine particle and other components. Here, the solid content of the coating composition is all components except for a solvent and a liquid monomer and oligomer are also included in the solid content.

When the inorganic superfine particle (B) has a polymerizable functional group, not only the binder component but also the inorganic superfine particle forms a covalent bond when curing the coating composition of the present invention. Therefore, even if the inorganic superfine particle is compounded in a large amount, the coating layer is not apt to become fragile and therefore the layer-forming characteristics can be maintained.

The inorganic superfine particle (B) in the coating composition sufficiently produces the effect of tightening the coating layer in such a small amount as to give no influence at all or to give a little influence on the refractive index-reducing ability of the fluorine-containing component. However, in the case where the tightening effect is insufficiently obtained, the inorganic superfine particle (B) may be compounded in a relatively large amount according to the need. Also, when the proportion of the inorganic superfine particle to be compounded is increased, the fluorine-containing component in the coating composition is diluted, so that the refractive index-reducing action of the fluorine-containing component is weakened. However, micro-voids comes to be formed in the coating layer instead, and the refractive index of the coating layer is reduced to a value close to that of air by the action of the micro-voids, with the result that a low refractive index is obtained by the cooperation between the fluorine-containing component and the micro-voids.

When the proportion of the inorganic superfine particle in the coating composition is in a range from 50% by weight or less based on the total amount of solids, no micro-void is produced in general and the refractive index of the coating layer can be reduced primarily by the action of the fluorine-containing component. When the proportion of the inorganic superfine particle to be compounded in the coating composition exceeds 50% by weight based on the total amount of solids, micro-voids come to be formed in the coating layer though depending on the percentage composition of the coating composition and the refractive index can be therefore reduced by the actions of fluorine containing component and the micro-voids. When the proportion of the inorganic superfine particle to be compounded in the coating composition becomes 75% by weight or more based on the total amount of solids, the refractive index-reducing action of micro-voids is relatively strengthened though the action of the fluorine-containing component remains.

If the proportion of the inorganic superfine particle to be compounded in the coating composition is raised, the refractive index-reducing action of the fluorine-containing component is weakened. However, the fluorine-containing component contributes to a reduction in the refractive index of the coating layer and there is no change in such a situation that the inorganic superfine particle inhibits a reduction in the hardness and strength of the coating layer which reduction is caused by the fluorine-containing component.

The coating composition according to the present invention contains the aforementioned fluorine-containing component (a) and the inorganic superfine particle (B) as essential components and, further, may be formulated with, besides the binder component other than the fluorine-containing component (a), a solvent for preparing a coating liquid, a polymerization initiator, a hardener, a crosslinking agent, a ultraviolet cutting agent, a ultraviolet absorber, a surface regulator (leveling agent) or other components according to the need.

The polymerization initiator is not always necessary in the present invention. However, there is the case where ionizing radiation-curable groups contained in the fluorine-containing component (a), organic superfine particle (B) and other binder components which are optional components have difficulties in running a polymerization reaction directly by the irradiation with ionizing radiation. In such a case, it is desirable to use a proper initiator in accordance with the reaction system of the binder component and inorganic superfine particle.

For example, when the fluorine-containing component (a) has an ethylenic unsaturated bond which is an ionizing radiation-curable group, a photo-radical initiator is used. As the photo-radical initiator, for example, acetophenones, benzophenones, ketals, anthraquinones, thioxanthones, azo compounds, peroxides, 2,3-dialkyldione compounds, disulfide compounds, thiuram compounds and fluoroamine compounds are used Specific examples of the photo-radical initiator may include 1-hydroxy-cyclohexyl-phenyl-ketone, 2-methyl-1[4-(methylthio)phenyl]-2-morpholinopropan-1-one, benzyldimethyl ketone, 1-(4-dodecylphenyl)-2-hydroxy-2-methylpropan-1-one, 2-hydroxy-2-methyl-1-phenylpropan-1-one, 1-(4-isopropylphenyl)-2-hydroxy-2-methylpropan-1-one and benzophenone. Among these compounds, 1-hydroxy-cyclohexyl-phenyl-keytone and 2-methyl-1[4-(methylthio)phenyl]-2-morpholinopropan-1-one are preferably used in the present invention because these compounds respectively initiate and promote a polymerization reaction caused by irradiation with ionizing radiation even in a small amount. Either one of these compounds may be used or both of these compounds may be used by combining them. These compounds are present in commercially available products. For example, 1-hydroxy-cyclohexyl-phenyl-ketone is available in the trade name of IRGACURE 184 from Chiba Speciality Chemicals.

In the case of using a photo-radical initiator, it is compounded in a proportion of usually 3 to 15 parts by weight based on 100 parts of the binder component primarily containing a fluorine-containing component.

The hardener is compounded to promote the heatcurable reaction of heatcurable polar groups contained in the fluorine-containing component (b) and other binder components which are optional components. When the heatcurable polar group is a hydroxyl group, a compound, such as methylolmelamine, having a basic group and a compound, such as a metal alkoxide, having a hydrolyzable group generating a hydroxyl group by hydrolysis are used.

As the basic group, an amine, nitrile, amide and isocyanate group are preferably used and as the hydrolyzable group, an alkoxy group is preferably used. In the latter case, particularly an aluminum compound represented by the following formula (4) and its derivatives have good compatibility with a hydroxyl group and are therefore preferably used.

AlR$_3$ (4)

wherein Rs, which may be the same or different, respectively represent a halogen or an alkyl having 10 or less and preferably 4 or less carbon atoms, alkoxy, allyloxy or hydroxy group, provided that all or a part of these groups may be replaced by chelating ligands.

The compounds represented by the formula (4) may be selected from aluminum compounds, and/or oligomers, and/or complexes, inorganic or organic aluminum salts derived from these aluminum compounds. Specific examples of the compound represented by the formula (4) may include aluminum-sec-butoxide, aluminum-iso-propoxide and complexes of these compounds and acetylacetone, ethyl acetoacetate, alkanolamines, glycols and derivatives of these compounds.

Also, when a heatcurable polar group contained in the fluorine-containing component (a) or other binder component is an epoxy group, a polyvalent carboxylic acid anhydride or a polyvalent carboxylic acid is usually used as a hardener in the coating composition.

Specific examples of the polyvalent carboxylic acid anhydride may include aliphatic or alicyclic dicarboxylic acid anhydrides such as phthalic acid anhydride, itaconic acid anhydride, succinic acid anhydride, citraconic acid anhydride, dodecenylsuccinic acid anhydride, tricarballylic acid anhydride, maleic acid anhydride, hexahydrophthalic acid anhydride, dimethyltetrahydrophthalic acid anhydride, himick acid anhydride and nadinic acid anhydride; aliphatic polyvalent carboxylic acid dianhydrides such as 1,2,3,4-butanetetracarboxylic acid dianhydride and cyclopentanetetracarboxylic acid dianhydride; aromatic polyvalent carboxylic acid anhydrides such as pyromellitic acid anhydride, trimellitic acid anhydride, benzophenonetetracarboxylic acid anhydride; ester group-containing acid anhydrides such as ethylene glycol bistrimellitate and glycerol tristrimellitate. As particularly preferable examples, aromatic polyvalent carboxylic acid anhydrides may be given. Commercially available epoxy resin hardeners comprising of carboxylic acid anhydrides may also be preferably used.

Also, specific examples of the polyvalent carboxylic acid in the present invention may include aliphatic polyvalent carboxylic acids such as succinic acid, glutaric acid, adipic acid, butanetetracarboxylic acid, maleic acid and itaconic acid; aliphatic polyvalent carboxylic acid such as hexahydrophthalic acid, 1,2-cyclohexanedicarboxylic acid, 1,2,4-cyclohexanetricarboxylic acid and cyclopentanetetracarboxylic acid and aromatic polyvalent carboxylic acids such as phthalic acid, isophthalic acid, terephthalic acid, pyromellitic acid, trimellitic acid, 1,4,5,8-naphthalenetetracarboxylic acid and benzophenonetetracarboxylic acid and preferably aromatic polyvalent carboxylic acids.

When using a hardener, it is compounded in a proportion of usually 0.05 to 30.0 parts by weight based on 100 parts by weight of the total of the binder component primarily containing the fluorine-containing component.

Crosslinking agents are components which promote crosslinking reactions among molecules of the binder components containing the fluorine-containing component (a), between the binder component and the inorganic superfine particle (B) and among the inorganic superfine particles (B). For example, when the heatcurable polar group contained in the fluorine-containing component (a) is a hydroxyl group, the aforementioned aluminum chelates are preferably used.

When a liquid fluorine-containing monomer and/or oligomer is used as the fluorine-containing component in a relatively large amount, the fluorine-containing monomer and/or oligomer can function as a liquid medium for preparing a coating liquid and there is therefore the case where the coating composition can be prepared in the state of a coating liquid by dissolving, dispersing or diluting the solid components of the coating composition without using a solvent. Therefore, in the present invention, though a solvent is not always necessary, a solvent is used frequently in order to dissolve and disperse solid components, followed by adjusting the concentration to prepare a coating liquid superior in coating aptitude.

No particular limitation is imposed on the solvent used to dissolve and disperse the solid components of the coating composition of the present invention and various organic solvents, for example, alcohols such as isopropyl alcohol, methanol and ethanol; ketones such as methyl ethyl ketone, methyl isobutyl ketone and cyclohexanone; esters such as ethyl acetate and butyl acetate; halogenated hydrocarbons; aromatic hydrocarbons such as toluene and xylene; or mixtures of these solvents may be used.

In the present invention, ketone base organic solvents are preferably used. If the coating composition according to the present invention is prepared using a ketone base solvent, the resulting coating liquid can be easily applied to the surface of a substrate thinly and evenly and also the evaporation rate of the solvent is appropriate after the coating liquid is applied, so that drying nonuniformity is scarcely caused and a large area coating layer having an even thin thickness can be obtained with ease.

In order to provide a function as an antiglare layer to a hard coating layer which is a support layer of an antireflecting layer, there is the case where the surface of the hard coating layer is formed with fine irregularities and the coating composition according to the present invention is applied to the hard coating layer through or not through a middle refractive index layer or a high refractive index layer to form a low refractive index layer. The coating composition according to the present invention can be evenly applied to the surface having such fine irregularities and it is therefore possible to prevent coating unevenness when the coating liquid is prepared using a ketone base solvent.

As the ketone base solvent, a single solvent comprising of one ketone, a mixed solvent comprising of two or more ketones and those which contain one or two or more ketones and do not lose the nature of a ketone solvent may be used. A ketone base solvent in which 70% by weight or more and particularly 80% by weight or more thereof is occupied by one or two or more ketones is used.

Also, the amount of the solvent is properly controlled such that each component can be evenly dissolved and dispersed, no coagulation is caused during storing after the coating liquid is prepared and the concentration of the coating composition is not made to be excessively low. It is preferable that the amount of the solvent is decreased within the range satisfying this condition to prepare a coating composition with a high concentration, the coating composition is stored in the condition that the volume of the coating composition is reduced and a necessary amount of the coating composition be taken out to dilute the coating composition to a concentration suitable for a coating operation. In the present invention, the solvent is used in an amount of 50 to 95.5 parts by weight based on 0.5 to 50 parts by weight of the whole solid and more preferably in an amount of 70 to 90 parts by weight based on 10 to 30 parts by weight of the whole solid when the total amount of the solvent and the solid is 100 parts by weight, thereby obtaining a coating composition superior in, particularly, dispersion stability and suitable for long-term storage.

In order to prepare the coating composition according to the present invention by using the aforementioned each component, dispersion treatment may be performed according to a general method of preparing a coating liquid. For example, each essential component and each desired component are mixed in an desired order and a medium such as beads is poured into the obtained mixture to carry out dispersion treatment properly using a paint shaker or beads mill, thereby obtaining a coating composition.

The coating composition obtained in this manner comprises at least;

(A) a binder system which comprises one or two or more binder components containing a fluorine-containing component (a) having one or both of a functional group which can be cured by ionizing radiation and a polar group which can be heat-cured, and contains both an ionizing radiation-curable functional group and a heatcurable polar group as a whole; and (B) an inorganic superfine particle of the order of submicron in size which can be dispersed in a colloidal state in a liquid medium for preparing a coating liquid.

In this coating composition, the inorganic superfine particle may not be dispersed in a colloidal state when the composition is put in a highly concentrated state for storing but is dispersed evenly in a colloidal state in a coating liquid when increasing the amount of a solvent or a liquid-state fluorine-containing monomer and/or oligomer to adjust the composition to a final applicable concentration.

A liquid coating composition can be obtained which contains the binder system (A) containing the fluorine-containing component (a) and in which the inorganic superfine particle (B) is dispersed in a colloidal state by adjusting the coating composition according to the present invention to a final applicable concentration.

When a solvent is used as a liquid medium, this liquid coating composition takes the form of a structure in which the binder system (A) containing the fluorine-containing component (a) is dissolved and dispersed and also the inorganic superfine particle (B) of the order of submicron in size is dispersed in a colloidal state in the solvent.

Also, when a liquid fluorine-containing monomer and/or oligomer is used as the binder component without using a solvent, this liquid coating composition takes the form of a structure in which the inorganic superfine particle (B) of the order of submicron in size is dispersed in a colloidal state in the liquid medium comprising of the fluorine-containing monomer and/or oligomer used as the binder component.

In order to give the coating composition sufficient adhesion to a surface of an object for coating process, the amounts of the fluorine-containing component (a) having a polar group and other binder component having a polar group are controlled to adjust the amount of heatcurable polar groups present in the coating composition to 5 to 80 mol % when the total amount of ionizing radiation-curable groups and heatcurable polar groups is set to 100 mol %. The adhesion is more improved with an increase in the amount of heatcurable polar groups present in the coating composition. However, if the amount of the heatcurable polar group is excessive, the amount of ionizing radiation-curable groups contained in the coating composition is relatively decreased and an improvement in the hardness and strength of the coating layer is not expected or high-speed curing by ionizing radiation curing becomes impossible, giving rise to such a disadvantage that productivity is dropped. Also, when the amount of the heatcurable polar group is excessively large, many hydrogen bonds are formed between the binder component and the inorganic superfine particle in the coating liquid of the coating composition, with the result that there is a fear as to the occurrence of gelation.

This coating composition may be applied to a support such as a substrate by using a various methods such as a spin coating method, dipping method, spraying method, slide coating method, bar coating method, roll coater method, meniscus coater method, flexographic printing method, screen printing method and beads coater method.

No particular limitation is imposed on the support coated with the coating composition of the present invention. Preferable examples of the substrate may include a glass plate; and films formed of various resins such as triacetate cellulose (TAC), polyethylene terephthalate (PET), diacetyl cellulose, acetate butyrate cellulose, polyether sulfone, acryl base resins; polyurethane base resins; polyester; polycarbonate; polysulfone; polyether; trimethylpentene; polyether ketone; and (meth)acrylonitrile. The thickness of the substrate is usually about 25 μm to 1000 μm and preferably 50 μm to 190 μm.

A coating liquid of the coating composition is applied to a body, such as a substrate, to be coated directly or through other layers such as a hardcoat layer and light-transmittable glare-proof layer and dried, whereby a coating layer which is highly adhesive to a surface of an object for coating process is obtained owing to the action of a heatcurable polar group.

Also, when applied, the coating composition according to the present invention has excellent coatability, so that it can be easily applied to an object for coating process, thinly, extensively and evenly and it is therefore possible to form a large area thin layer. When, particularly, a ketone solvent is used, a uniform large-area thin layer is particularly easily formed because the evaporation rate of the solvent is proper and drying unevenness is scarcely caused.

When the obtained coating layer is dried using a heating device such as an oven according to the need and irradiated with ionizing radiation, it is cured by the action of the ionizing radiation-curable group, thereby obtaining a coating layer which has a very low refractive index, possesses a hardness and strength enough to fit for practical use and has high transparency. In the case where the inorganic superfine particle (B) has an ionizing radiation-curable group, the fluorine-containing component (A) and the inorganic superfine particle (B) form a covalent bond, when the coating layer is irradiated with ionizing radiation, resulting in the formation of a more firm coating layer.

Although in the present invention, it is unessential to heat-cure the coating layer of the coating composition, the hardness and strength of the coating layer can be more improved by heat-curing the coating layer because the heatcurable polar group also forms a crosslinking bond directly or through a hardener by heating the coating layer to above a fixed temperature, When the inorganic superfine particle (B) has a heatcurable polar group like the fluorine-containing component, the fluorine-containing component (A) and the inorganic superfine particle (B) form a covalent bond during the heat-curing reaction, resulting in the formation of a more firm coating layer.

When one and preferably both of the fluorine-containing component (A) and the inorganic superfine particle (B) have two or more ionizing radiation-curable groups or heatcurable polar groups, a coating layer having crosslinking structures between the fluorine-containing polymers, between the inorganic superfine particles and between the fluorine-containing polymer and the inorganic superfine particle is formed by curing the coating layer.

The coating layer obtained in this manner is produced by evenly mixing the inorganic superfine particle of the order of submicron in size in the curable binder containing fluorine and preferably has a structure in which the fluorine-containing components, and the fluorine-containing component and inorganic superfine particle which are added simultaneously are covalent-bonded, and contains other components according to the need.

This coating layer has a hardness and strength enough to fit for practical use even when the fluorine content of the binder is high since the cured binder is tightened by the cohesive force and hardness of the inorganic superfine particle (B) whereby sufficient layer hardness and layer strength are given thereto. The cured binder and the inorganic superfine particle are covalent-bonded, which further improves the layer hardness and layer strength of the coating layer. In the case where the binder of the coating layer forms a crosslinking structure and preferably the inorganic superfine particle also forms a crosslinking structure together with the binder of the coating layer, this is preferable because various material properties such as layer hardness, layer strength and durability are particularly excellent. Further, since the metal oxide fine particle has a size of the order of submicron, the coating layer is superior in transparency.

The coating layer obtained in the present invention contains a large amount of fluorine so that it has a very low refractive index, has a hardness and strength enough to fit for practical use and is also superior in transparency. The coating layer is therefore utilized as optical thin layers in various applications and particularly preferably as a low-refractive index layer of an anti-reflecting layer.

According to the present invention, a coating layer having a sufficient hardness and strength is obtained though the refractive index of the coating layer is 1.45 or less or the number of fluorine atoms contained in the coating layer is the same as or more than the number of carbon atoms contained in the coating layer. The numbers of fluorine atoms and carbon atoms may be respectively measured by an elemental analysis method.

The present invention ensures that when a coating layer having a layer thickness of 0.05 to 0.3 μm is formed on a substrate directly or through other layers, the refractive index can be adjusted to 1.45 or less and also the haze value prescribed in JIS-K7361-1 is equal to the haze value of only the substrate or limited such that the difference between the both is within 0.1%.

Also, according to the present invention, when a coating layer having a layer thickness of 0.05 to 0.3 μm is formed on a substrate directly or through other layers, the refractive index can be adjusted to 1.45 or less and also, a coating layer is obtained which has the characteristics that the load at which a change in haze is found when the surface of the layer is rubbed 20 times using steel wool No. #0000 is 1 Kg or more and also has a very low refractive index, high transparency and also a hardness and strength enough to fit for practical use.

Also, according to the present invention, when a coating layer having a layer thickness of 0.05 to 0.3 μm is formed on a substrate directly or through other layers, the refractive index can be made to be 1.45 or less, a change in haze after and before the surface of the layer is rubbed 20 times using steel wool No. #0000 at a load of 200 g can be limited to 5% or less and therefore a coating layer having a very low refractive index, high transparency and a hardness and strength enough to fit for practical use is obtained.

Next, a specific example of an anti-reflecting layer to which the coating layer of the present invention is applied will be explained. The coating layer according to the present invention has light transmittability, may be used to one layer among a monolayer type or multilayer type anti-reflecting layer prepared by laminating one or more layers (light transmitting layer) differing in refractive index from each other in the case of laminating two or more layers, is preferable as, particularly, a low-refractive index layer and is used to form the outermost layer of the anti-reflecting layer. In the present invention, it is to be noted that among a multilayer type anti-reflecting layer, a layer having the highest refractive index is called a high-refractive index layer, a layer having the lowest refractive index is called a low-refractive index layer and a layer other than the above layers is called a middle-refractive index layer.

An anti-reflecting effect is obtained by the provision of only one coating layer according to the present invention on a surface to be coated with an anti-reflecting layer, for example, on the display surface of an image display device when the refractive index of the surface itself to be coated and the refractive index of the coating layer according to the present invention are exactly balanced. Therefore, the coating layer according to the present invention effectively functions as a monolayer anti-reflecting layer though depending on the case.

The coating layer according to the present invention is preferably used to form at least one layer, particularly, a low-refractive index layer, of a multilayer type anti-reflecting layer for covering the display surface of an image display device such as a liquid crystal display device (LCD), cathode ray tube display device (CRT), plasma display panel (PDP) and electroluminescence display (ELD).

FIG. 1 is a view typically showing the section of an example (101) of a liquid crystal display device, the display surface of which is coated with a multilayer type anti-reflecting layer including, as a light-transmitting layer, the coating layer according to the present invention. The liquid crystal display 101 has a structure in which a color filter 4 is prepared which is provided with an RGB pixel part 2 (2R, 2G, 2B) and a black matrix layer 3 on one surface of a glass substrate 1 on the display surface side, a transparent electrode layer 5 is disposed on the pixel part 2 of the color filter, a transparent electrode layer 7 is disposed on one surface of a glass substrate 6 on the back light side, the glass substrate on the back light side is made to be opposite to the color filter with a fixed gap such that the transparent electrodes 5 and 7 face each other, the periphery is bonded with a sealing material 8, a liquid crystal L is sealed into the gap, an orientation layer 9 is formed on the outer surface of the backside glass substrate 6, a polarizing film 10 is applied to the outer surface of the display surface side glass substrate 1 and a back light unit 11 is arranged in the rear.

Figure 2:
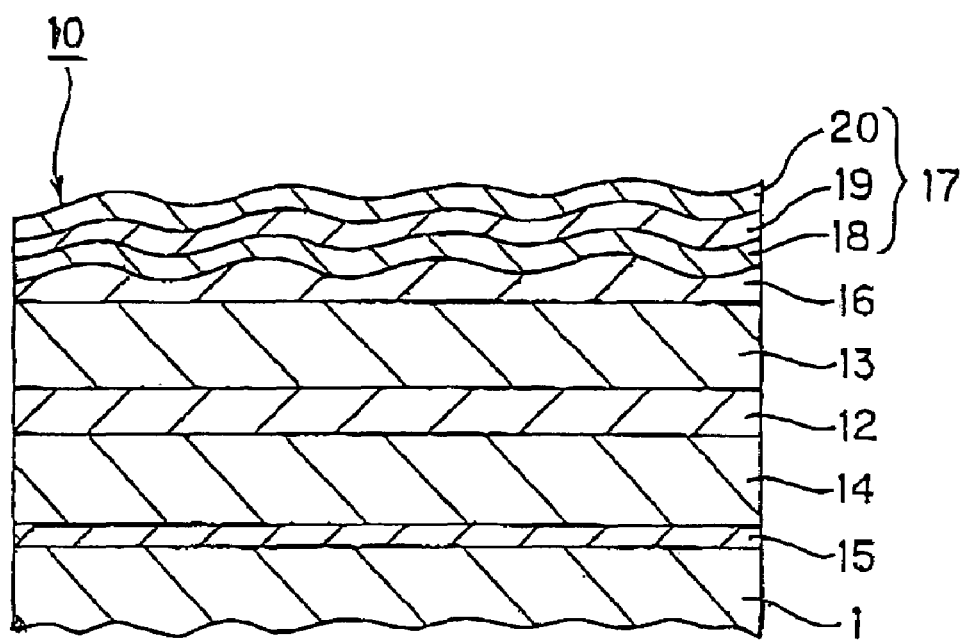
FIG. 2 is a view typically showing the section of an example of an orientation plate provided with a multilayer type anti-reflecting layer containing a coating layer according to the present invention.

FIG. 2 is a view typically showing the section of the polarizing film 10 applied to the outer surface of the display surface side glass substrate 1. The display surface side polarizing film 10 has a structure in which both surfaces of a polarizing element 12 made of polyvinyl alcohol (PVA) or the like are coated with protect films 13 and 14 made of triacetyl cellulose (TAC) or the like, an adhesive layer 15 is disposed on the backside protect film and a hardcoat layer 16 and a multilayer type anti-reflecting layer 17 are formed in this order on the watching side protect film, and is applied to the display surface side glass substrate I through the adhesive layer 15.

Here, in order to reduce a glare by distributing the light emitted from the inside like the case of a liquid crystal display device, the hardcoat layer 16 may be processed to form irregularities on the surface thereof or may be an antiglare layer provided with irregularities on the surface thereof by dispersing an inorganic or organic filler in the hardcoat layer. Also, the hardcoat layer 16 may be made to be a layer having internal diffusibility by dispersing an inorganic or organic filler. The hardcoat layer may be structured of a multilayer comprising of two or more layers and the aforementioned hardcoat layers may be used by combining them optionally.

The part of the multilayer type anti-reflecting layer 17 has a three-layer structure in which a middle-refractive index layer 18, a high-refractive index layer 19 and a low-refractive index layer 20 are laminated in this order from the back light side to the watching side. The multilayer type anti-reflecting layer 17 may have a two-layer structure in which the high-refractive index layer 19 or the middle-refractive index layer 18 and the low-refractive index layer 20 are laminated in this order. In the case where irregularities are formed on the surface of the hardcoat layer 16, the multilayer type anti-reflecting layer 17 also has irregularities as is illustrated. Also, there is the case where the high-refractive index layer 19 and the middle-refractive index layer 18 have hardcoat characteristics and double as a hardcoat layer.

The low-refractive index layer 20 is a coating layer formed by applying the coating composition according to the present invention to the high-refractive index layer 19, drying the coating composition and photo-curing the composition. The refractive index of the low-refractive index layer is made to be 1.46 or less and preferably 1.41 or less. It is possible to reduce the refractive index to about 1.20. Also, the middle-refractive index layer 18 and the high-refractive index layer 19 may be a vapor deposition layer of an inorganic oxide having a high refractive index such as titanium oxide or zirconium oxide in which the layer is formed by a vapor deposition method such as a chemical vapor deposition method (CVD) or a physical vapor deposition method (PVD) or may be a coating layer prepared by dispersing an inorganic oxide fine particle having a high refractive index. A light-transmitting layer having a refractive index ranging from 1.46 to 1.80 and a light-transmitting layer having a refractive index of 1.65 or more are used as the middle-refractive index layer 18 and the high-refractive index layer 19 respectively.

Moreover, when it is necessary to impart antistatic characteristics or electrostatic characteristics, an electroconductive layer may be provided on a substrate film or the hardcoat layer may be made to contain an electroconductive particle. Further, the same characteristics can be obtained by using the high-refractive index inorganic oxide fine particle which is to be dispersed in the middle-refractive index layer and high refractive index layer and itself has electroconductivity. In addition, two or more of any of the above layers having electroconductivity may be combined.

Because the action of the anti-reflecting layer ensures that the refractive index of the light emitted from an external light source is reduced, the reflection of scenes and a fluorescent light is decreased, which improves the visibility of displays. Also, unlike such a condition that external light is reflected in the surface of a display and the display surface glitters in the light, the reflected light of the external light is reduced by the light-scattering effect of the irregularities of the hardcoat layer 16, more improving the visibility of the display.

In the case of the liquid crystal display device 101, the middle-refractive index layer 18 having a refractive index adjusted to a range from 1.46 to 1.80 and the high-refractive index layer 19 having a refractive index adjusted to 1.65 or more are formed on a laminate comprising of a polarizing element 12 and protect films 13 and 14 and further, the coating composition according to the present invention may be applied to form the low-refractive index layer 20. Then, the polarizing film 10 including the anti-reflecting layer 17 may be applied to the watching side glass substrate 1 through the adhesive layer 15.

On the other hand, an orientation plate is not applied to the display surface of a CRT and it is therefore necessary to dispose an anti-reflecting layer directly. However, it is a troublesome work to apply the coating composition according to the present invention on the display surface of the CRT. In such a case, an anti-reflecting layer is formed if an anti-reflecting film containing the coating layer according to the present invention is produced and this film is applied to the display surface and it is therefore unnecessary to apply the coating composition according to the present invention to the display surface.

One or more light-transmitting layers each having light-transmittance and a regulated refractive index are laminated on one surface or both surfaces of a substrate film having light-transmittance, wherein in the case of laminating two or more layers, two or more types of light-transmitting layers differing in refractive index from each other are combined and laminated, and at least one of these light-transmitting layers is formed using the coating layer according to the present invention to obtain an anti-reflecting film. The substrate film and the light-transmitting layer must have light transmittability regulated to the extent that they can be used as anti-reflecting film material and are preferably those having transmittance closest to transparency.

Figure 3:
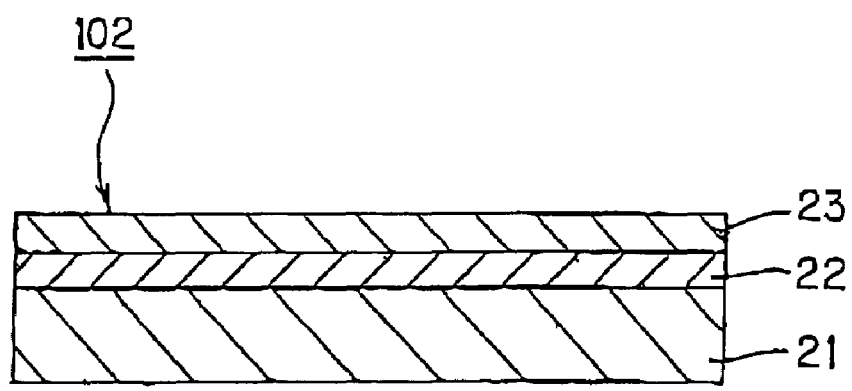
FIG. 3 is a view typically showing the section of an example of an anti-reflecting film containing a coating layer according to the present invention.

FIG. 3 is a view typically showing the section of one example of an anti-reflecting film (102) including the coating layer according to the present invention. The anti-reflecting film 102 has a structure in which a high-refractive index layer 22 is formed on one side of a substrate film 21 having light transmittability and a low-refractive index layer 23 is formed on the high-refractive index layer by applying the coating composition according to the present invention. In this example, the light-transmitting layers differing in refractive index from each other are only two layers, namely, the high-refractive index layer and the low-refractive index layer. However, three or more light-transmitting layers may be provided. In this case, not only the low-refractive index layer but also a middle-refractive index layer may be formed by applying the coating composition according to the present invention.

EXAMPLES

Example A

Example A1

Preparation of a Coating Composition

A fluorine-containing polymer having a heatcurable polar group and a fluorine-non-containing polyfunctional acrylate having both an ionizing radiation-curable group and a heatcurable polar group were combined to prepare a coating composition.

0.1 parts by weight of pentaerythritol triacrylate (manufactured by NIPPON KAYAKU CO., LTD.) was dissolved in 10.0 parts by weight of Opstar JN7217 (tradename, manufactured by JSR Corporation; solid content: 3% by weight; refractive index: 1.40; JS-1 liquid) which was a heatcurable fluorine-containing polymer containing a hydroxyl group. Then, 0.67 parts by weight of colloidal silica (trade name: MIBK-ST; manufactured by NISSAN CHEMICAL INDUSTRIES, LTD.; solid content: 30% by weight; primary particle diameter: 10 nm; methyl isobutyl ketone liquid) was added to and mixed with the liquid. Further, 0.02 parts by weight of IRGACURE 184 (trade name, manufactured by Ciba Specialty Chemicals) as a photopolymerization initiator and 0.02 parts by weight of ALCH-TR (tradename, manufactured by Kawaken Fine Chemicals Co., Ltd.) as a thermo-polymerizing hardener were dissolved in the above mixture to obtain a coating composition. The ratio by weight of the binder component to colloidal silica was 2:1.

Example A2

Preparation of a Coating Composition

A fluorine-containing polymer having an ionizing radiation-curable group and a fluorine-non-containing polyfunctional acrylate having both an ionizing radiation-curable group and a heatcurable polar group were combined to prepare a coating composition.

0.2 parts by weight of pentaerythritol triacrylate (manufactured by NIPPON KAYAKU CO., LTD.) was dissolved in 10.0 parts by weight of Opstar JM5010 (tradename, manufactured by JSR Corporation; solid content: 10% by weight; refractive index: 1.41; methyl ethyl ketone liquid) which was an ionizing radiation-curable fluorine-containing component. Then, 2 parts by weight of colloidal silica (trade name: MIBK-ST; manufactured by NISSAN CHEMICAL INDUSTRIES, LTD.; solid content: 30% by weight; primary particle diameter: 10 nm; methyl isobutyl ketone liquid) was added to and mixed with the liquid. Further, 0.06 parts by weight of IRGACURE 184 (trade name, manufactured by Ciba Specialty Chemicals) as a photopolymerization initiator was dissolved in the above mixture to obtain a coating composition. The ratio by weight of the binder component to colloidal silica was 2:1.

Example A3

Preparation of a Coating Composition

A fluorine-containing polymer having both an ionizing radiation-curable group and a heatcurable polar group and a fluorine-non-containing polyfunctional acrylate having both an ionizing radiation-curable group and a heatcurable polar group were combined to prepare a coating composition.

(A3-1) Synthesis of a Fluorine Polymer 50 parts by weight of a 10 wt % trichlorotrifluoroethane liquid of $CH_2=CFCOOCH_2(CF_2)_5CH_2OH$ was placed in a glass container equipped with a cooling tube and 0.2 parts by weight of azobisoisobutyronitrile as an initiator was dissolved in the liquid. The mixture was stirred at 80° C. for 24 hours in a nitrogen atmosphere to run a polymerization reaction. After 24 hours, low-boiling point materials were distilled under reduced pressure to obtain 4.5 g of a colorless transparent polymer.

The resulting polymer was dissolved in tetrahydrofuran to obtain a liquid (solid content: 10% by weight). 0.8 parts by weight of 2-methacryloyloxyethylisocyanate was added to 30 parts by weight of the resulting liquid to run a reaction at ambient temperature for 3 hours thereby introducing a methacryloyl group into a part of hydroxyl groups of the polymer.

After 3 hours, the reaction liquid was washed with hexane to remove unreacted products to obtain a fluorine-containing polymer having both an ionizing radiation-curable group and a heatcurable polar group. The number average molecular weight of this polymer by a GCP method was about 30,000 on a polyethylene basis.

(A3-2) Preparation of a Coating Composition 0.2 parts by weight of pentaerythritol triacrylate (manufactured by NIPPON KAYAKU CO., LTD.) was dissolved in 10.0 parts by weight of 10 wt % methyl isobutyl ketone liquid of the resulting fluorine-containing polymer. Then, 2 parts by weight of colloidal silica (trade name: MIBK-ST; manufactured by NISSAN CHEMICAL INDUSTRIES, LTD.; solid content: 30% by weight; primary particle diameter: 10 nm; methyl isobutyl ketone liquid) was added to and mixed with the liquid. Further, 0.06 parts by weight of IRGACURE 184 (trade name, manufactured by Ciba Specialty Chemicals) as a photopolymerization initiator was dissolved in the above mixture to obtain a coating composition. The ratio by weight of the binder component to colloidal silica was 2:1.

Comparative Example A1

Preparation of a Coating Composition

A coating composition was obtained using the same composition and the same procedures as in Example A1 except that no colloidal silica was added.

Comparative Example A2

Preparation of a Coating Composition

A coating composition was obtained using the same composition and the same procedures as in Example A2 except that no colloidal silica was added.

Comparative Example A3

Preparation of a Coating Composition

A coating composition was obtained in the same manner as in Example A1 except that 0.2 parts by weight of a dispersion of a non-colloidal silica superfine particle (trade name: Aerosil R971, manufactured by Nippon Aerosil Co., Ltd.) was used in place of the colloidal silica in Example 1. Using the resulting coating composition, a coating layer was formed. However, a transparent coating layer was not obtained due to the coagulation of the pigment and therefore, the refractive index, reflectance and others which will be explained later could not be measured.

Example A4

Production of a Monolayer Type Anti-Reflecting Layer (A4-1) Formation of a Transparent Hardcoat Layer A hardcoat coating liquid (A4-1) having the following composition was applied to a triacetyl cellulose substrate by using a bar coater and solvents were removed by drying. Then, the dried coating layer was cured using the H valve of a UV irradiation apparatus (manufactured by Fusion UV Systems JapanKK) as a light source at an intensity of 300 mJ to form a transparent hardcoat layer having a layer thickness of 4 µm thereby obtaining a hardcoat substrate A4-1.

<Hardcoat Coating Liquid (A4-1)>
Pentaerythritol tetraacrylate: 20.0 parts by weight
Photopolymerization initiator (trade name: IRGACURE 184; manufactured by Chiba Speciality Chemicals): 1.0 parts by weight
Methyl isobutyl ketone: 80 parts by weight (A4-2) Formation of an Antiglare Ability-Imparting Hardcoat Layer A hardcoat coating liquid (A4-2) having the following composition was applied to a triacetyl cellulose substrate by using a bar coater and solvents were removed by drying. Then, the dried coating layer was cured using the H valve of a UV irradiation apparatus (manufactured by Fusion UV Systems JapanKK) as a light source at an intensity of 300 mJ to form a transparent hardcoat layer having a layer thickness of 4 µm thereby obtaining an antiglare ability-imparting hardcoat substrate A4-2.

<Hardcoat Coating Liquid (A4-2)>
Pentaerythritol tetraacrylate: 30.0 parts by weight
Cellulose acetate propionate: 0.4 parts by weight
Polystyrene beads paste (trade name SX-130, manufactured by Soken Chemical & Engineering Co., Ltd.): 10.0 parts by weight
Photopolymerization initiator (trade name: IRGACURE 184; manufactured by Chiba Speciality Chemicals): 1.0 parts by weight
Methyl isobutyl ketone: 72.0 parts by weight (A4-3) Formation of a Low-Refractive Index Layer Each coating composition obtained in Examples A1, A2 and A3 and Comparative Examples A1, A2 and A3 was applied to the hardcoat substrates A4-1 and A4-2, produced in the above processes, by using a bar coater and solvent were removed by drying. Then, the dried coating layer was cured using the H valve of a UV irradiation apparatus (manufactured by Fusion UV Systems JapanKK) as a light source at an intensity of 300 mJ and then heated at 80° C. for one hour to form a low-refractive index layer thereby obtaining anti-reflecting films A4-3a and A4-3b formed with an anti-reflecting layer. The layer thickness of the low-refractive index layer was set such that the lowest refractive index was obtained at 550 nm when measuring the refractive index by using a spectrophotometer (manufactured by Shimadzu Corporation).

Example A5

Production of a Monolayer Type Anti-Reflecting Layer

Each coating composition of Examples A1 to A3 was applied to each hardcoat layer of the aforementioned hardcoat substrates A4-1 and A4-2, dried and irradiated with UV rays to cure the composition in the same method as in Example A4. Thereafter, a low-refractive index layer was formed in the same method as in Example A4 to obtain anti-reflecting films A5-3a and A5-3b formed with an anti-reflecting layer.

(Method of Evaluation)

Each evaluation shown below was made. The results of the evaluations are shown in Tables 1 and 2.

(1) Refractive Index of a Coating Layer

Each coating composition obtained in Examples A1, A2 and A3 and Comparative Examples A1, A2 and A3 was applied to a silicon wafer by using a spin coater and solvents were removed by drying. Then, the dried coating layer was cured using the H valve of a UV irradiation apparatus (manufactured by Fusion UV Systems JapanKK) as a light source at an intensity of 500 mJ and then heated at 80° C. for one hour to obtain a coating layer having a layer thickness of 0.1 µm. The refractive index of the coating layer was measured by a spectral ellipsometer (UVISEL; manufactured by Jobin Yvon) using helium ion laser light at a wavelength 633 nm.

(2) Ratio of the Number of Fluorine Atoms to the Number of Carbon Atoms (F/C Ratio) in the Coating Layer The ratio of the number of fluorine atoms (F) to the number of carbon atoms (C) in the coating layer obtained in the above (1) was measured using an elemental analysis method using an X-ray photoelectron spectral device ESCALAB 220i-XL manufactured by VG Scientific in the following conditions.

<Specification of the Device>
X-ray source: Al Kα (monochromatic ratio)
X-ray power: 200 W (10 kV, 20 mA)
Working lens: Large Area XL
Charge neutralization: electron neutralizing gun, +4 V, using a neutralization auxiliary mask (Al conductive tape)
Photoelectron escape angle: 90° (sample normal)
Measuring room vacuum: about $3.0 \times 10^{-7}$ Pa
Sample surface cleaning: $Ar^+$ ion etching <Measuring Condition>
A narrow scan spectrum method was used.
a) C 1s orbital
Measured energy range: 275 to 295 eV (range of overall energy)
Number of measuring points: 201 points
Step size: 0.10 eV
Number of scans: 7 times
Pass energy: 20 eV
b) F 1s orbital
Measured energy range: 675 to 695 eV (range of overall energy)
Number of measuring points: 201 points
Step size: 0.10 eV
Number of scans: 5 times
Pass energy: 20 eV <Determination of F/C Ratio>
The F/C ratio was determined by the ratio of the intensity of F to the intensity of C involved in the measuring range.

(3) Reflectance
Each reflectance of the anti-reflecting films A4-3a and A4-3b was measured using a spectrophotometer (manufactured by Shimadzu Corporation).

(4) Haze
Each haze of the anti-reflecting films A4-3a and A4-3b was measured using a turbidimeter (NDH2000; manufactured by Nippon Denshoku Industries Co., Ltd.)

(5) Film Hardness
Each surface of the anti-reflecting films A4-3a and A4-3b and further the anti-reflecting films A5-3a and A5-3b was rubbed 20 times using a steel wool #0000 under a load of 200 to 1 kg to detect the load value when the haze was changed.

TABLE 1

| Composition used | Refractive index | F/C ratio | Anti-reflecting film A4-3a | | | Anti-reflecting film A4-3b | | |
|---|---|---|---|---|---|---|---|---|
| | | | Reflectance | Haze | Film hardness | Reflectance | Haze | Film hardness |
| Example A1 | 1.43 | 1.5 | 1.5 | 1.3 | 1 Kg 20 Forward and backward motions | 1.2 | 19.0 | 1 Kg 20 forward and backward motions |
| Example A2 | 1.43 | 1.3 | 1.5 | 1.4 | 1 Kg 20 forward and backward motions | 1.2 | 19.0 | 1 Kg 20 forward and backward motions |
| Example A3 | 1.45 | 1.2 | 1.7 | 1.4 | 1 Kg 20 forward and backward motions | 1.2 | 19.0 | 1 Kg 20 forward and backward motions |
| Comparative Example A1 | 1.41 | 1.5 | 1.3 | 1.3 | 300 g | 1.0 | 18.3 | 300 g |
| Comparative Example A2 | 1.42 | 1.3 | 1.4 | 1.3 | 300 g | 1.1 | 19.0 | 300 g |
| Comparative Example A3 | — | — | — | — | — | — | — | — |

TABLE 2

| Composition used | Anti-reflecting film A5-3a Film hardness | Anti-reflecting film A5-3b Film hardness |
|---|---|---|
| Example A 1 | 800 g | 800 g |
| Example A 2 | 800 g | 800 g |
| Example A 3 | 500 g | 500 g |

Example B

Example B1

Preparation of a Coating Composition

A fluorine-containing polymer having an ionizing radiation-curable group, a fluorine-non-containing polyfunctional acrylate having both an ionizing radiation-curable group and a heatcurable polar group and colloidal silica having a polymerizable group were combined to prepare a coating composition.

0.2 parts by weight of pentaerythritol triacrylate (manufactured by NIPPON KAYAKU CO., LTD.) was dissolved in 10.0 parts by weight of Opstar JM5010 (tradename, manufactured by JSR Corporation; solid content: 10% by weight; refractive index: 1.41; methyl isobutyl ketone liquid), which is an ionizing radiation-curable type fluorine-containing polymer. Then, 6.0 parts by weight of colloidal silica (trade name: Highlink OG108; manufactured by Clariant (Japan) KK, silica: monomer component=30:70 (weight ratio); monomer type: tripropylene glycol diacrylate) was added to and mixed with the liquid. Further, 0.02 parts by weight of IRGACURE 184 (trade name, manufactured by Ciba Specialty Chemicals) as a photopolymerization initiator and 0.02 parts by weight of ALCH-TR (trade name, manufactured by Kawaken Fine Chemicals Co., Ltd.) as a thermo-polymerizing hardener were dissolved in the above mixture to obtain a coating composition.

Highlink OG108 (trade name) which is colloidal silica having a polymerizable group is a product in which colloidal silica is dispersed in a monomer and a part of the monomer is grafted on colloidal silica. The amount of the grafted monomer is 10% by weight or more of the colloidal silica. Also, the ratio of the binder component to silica is expressed by the ratio of the total amount of the fluorine-containing component and Highlink OG108 to the amount of silica of Highlink OG108. The ratio was 3:1 (binder component: silica).

Example B2

(B2-1) Preparation of a Reactive Superfine Particle 0.1 parts by weight of γ-acryloxypropyl trimethoxysilane (KBM5103; manufactured by Shin-Etsu Chemical Co., Ltd.) and 0.01 parts by weight of acetic acid were added to 10 parts by weight of colloidal silica (trade name: MIBK-ST; manufactured by Nissan Chemical Industries Ltd., solid content, 30% by weight; primary particle diameter: 10 nm; methyl isobutyl ketone liquid). The mixture was stirred under heating at 80° C. for 12 hours to covalent-bond a part of the above silane coupling agent with colloidal silica.

(B2-2) Preparation of a Coating Composition 1.18 parts by weight of the resulting reactive colloidal silica (the content of a solid remaining after the colloidal silica was raised to 300° C. by a thermogravimetric analysis was 34% by weight) was dispersed in a liquid obtained by dissolving 10.0 parts by weight of the same fluorine-containing component (trade name: Opstar JM5010) that was used in Example 1 and 0.2 parts by weight of pentaerythritol triacrylate (manufactured by NIPPON KAYAKU CO., LTD.) to obtain a coating composition. The ratio by weight of the binder component to silica was 3:1.

Comparative Example B1

The fluorine base binder component of Example B1 was used as a coating liquid as it was without adding colloidal silica.

Comparative Example B2

Comparative Example B2-1

Preparation of a Non-Colloidal Reactive Superfine Particle 0.1 parts by weight of γ-acryloxypropyl trimethoxysilane (KBM5103; manufactured by Shin-Etsu Chemical Co., Ltd.) and 0.01 parts by weight of acetic acid were added to 10 parts by weight of a non-colloidal silica superfine particle (trade name: Aerosil R971, manufactured by Nippon Aerosil Co., Ltd.). The mixture was stirred under heating at 80° C. for 12 hours to covalent-bond a part of the above silane coupling agent with no-colloidal silica superfine particle.

Comparative example B2-2

Preparation of a Coating Composition 3 parts by weight of a powder of the non-colloidal reactive silica superfine particle obtained in the Comparative example B2-1 was dispersed in 70 parts by weight of methyl isobutyl ketone. 0.2 parts by weight of pentaerythritol triacrylate (manufactured by NIPPON KAYAKU CO., LTD.) was dissolved in 10.0 parts by weight of the fluorine-containing component (trade name: Opstar JM5010; manufactured by JSR Corporation) used in Example B1. Then, 0.4 parts by weight of a dispersion liquid of the above non-colloidal reactive silica superfine particle was added to the liquid to obtain a coating composition. However, no transparent coating layer was obtained due to the coagulation of a pigment. So, the refractive index, reflectance and others which will be described later could not be measured.

Example B3

(B3-1) Preparation of a Reactive Superfine Particle 0.1 parts by weight of pentaerythritol acrylate was added to 10 parts by weight of the same colloidal silica (trade name: MIBK-ST) that was used in Example B2 and the mixture was refluxed under heating at 120° C. for one hour to fix a part of the monomer to colloidal silica.

(B3-2) Preparation of a Coating Composition 0.2 parts by weight of pentaerythritol triacrylate was dissolved in 10.0 parts by weight of the same fluorine-containing component (trade name: Opstar JM5010) that was used in Example B1. Then, 1.29 parts by weight of the aforementioned colloidal silica was added to the mixture to obtain a coating composition. The ratio by weight of the binder component to silica was 3:1.

Example B4

Production of a Monolayer Type Anti-Reflecting Layer (B4-1) Formation of a Transparent Hardcoat Layer A hardcoat coating liquid (B4-1) having the following composition was applied to a triacetyl cellulose substrate by using a bar coater and solvents were removed by drying. Then, the dried coating layer was cured using the H valve of a UV irradiation apparatus (manufactured by Fusion UV Systems JapanKK) as a light source at an intensity of 300 mJ to form a transparent hardcoat layer having a layer thickness of 4 μm thereby obtaining a hardcoat substrate B4-1.

<Hardcoat coating liquid (B4-1)>
  Pentaerythritol tetraacrylate; 20.0 parts by weight
  Photopolymerization initiator (trade name: IRGACURE 184; Chiba Speciality Chemicals): 1.0 parts by weight
  Methyl isobutyl ketone: 80 parts by weight (B4-2) Formation of an Antiglare Ability-Imparting Hardcoat Layer A hardcoat coating liquid (B4-2) having the following composition was applied to a triacetyl cellulose substrate by using a bar coater and solvents were removed by drying. Then, the dried coating layer was cured using the H valve of a UV irradiation apparatus (manufactured by Fusion UV Systems JapanKK) as a light source at an intensity of 300 mJ to form a transparent hardcoat layer having a layer thickness of 4 μm thereby obtaining an antiglare ability-imparting hardcoat substrate B4-2.

<Hardcoat Coating Liquid (B4-2)>
  Pentaerythritol tetraacrylate: 30.0 parts by weight
  Cellulose acetate propionate: 0.4 parts by weight
  Polystyrene beads paste (trade name SX-130, manufactured by Soken Chemical & Engineering Co., Ltd.): 10.0 parts by weight Photopolymerization initiator (trade name: IRGACURE 184; manufactured by Chiba Speciality Chemicals): 1.0 parts by weight Methyl isobutyl ketone: 72.0 parts by weight (B4-3) Formation of a Low-Refractive Index Layer Each coating composition obtained in Examples B1 to B3, Example A2 and Comparative Examples B1 and B2 was applied to the hardcoat substrates B4-1 and B4-2, produced in the above processes, by using a bar coater and solvent were removed by drying. Then, the dried coating layer was cured using the H valve of a UV irradiation apparatus (manufactured by Fusion UV Systems JapanKK) as a light source at an intensity of 300 mJ and then heated at 80° C. for one hour to form a low-refractive index layer thereby obtaining anti-reflecting films B4-3a and B4-3b formed with an anti-reflecting layer. The layer thickness of the low-refractive index layer was set such that the lowest refractive index was obtained in the vicinity of 550 nm when measuring the refractive index by using a spectrophotometer (manufactured by Shimadzu Corporation).

Example B5

Production of a Monolayer Type Anti-Reflecting Film

Each coating composition of Examples B1 to B3 was applied to each hardcoat layer of the aforementioned hardcoat substrates B4-1 and B4-2, dried and irradiated with UV rays to cure the composition in the same method as in Example B4. Thereafter, a low-refractive index layer was formed in the same method as in Example A4 except that the curing under heating was not carried out, to obtain anti-reflecting films B5-3a and B5-3b formed with an anti-reflecting layer.

(Method of Evaluation)

Each evaluation shown below was made. The results of the evaluations are shown in Tables 3 and 4. The coating composition of Example A2 (containing non-reactive colloidal silica) was also evaluated to compare the effect of the reactive superfine particles used in Examples B1 to B3 with that of a non-reactive superfine particle.

(1) Refractive Index of a Coating Layer

Each coating composition obtained in Examples B1 to B3, Example A2 and Comparative Examples B1 and B2 was applied to a silicon wafer by using a spin coater and solvents were removed by drying. Then, the dried coating layer was cured using the H valve of a UV irradiation apparatus (manufactured by Fusion UV Systems JapanKK) as a light source at an intensity of 500 mJ and then heated at 80° C. for one hour to obtain a coating layer having a layer thickness of 0.1 μm. The refractive index of the coating layer was measured by a spectral ellipsometer (UVISEL; manufactured by Jobin Yvon) using helium ion laser light at a wavelength 633 nm.

(2) Reflectance

Each reflectance of the anti-reflecting films B4-3a and B4-3b was measured using a spectrophotometer (manufactured by Shimadzu Corporation).

(3) Haze

Each haze of the anti-reflecting films B4-3a and B4-3b was measured using a turbidimeter (NDH2000; manufactured by Nippon Denshoku Industries Co., Ltd.)

(4) Film Hardness

Each surface of the anti-reflecting films B4-3a and B4-3b and further the anti-reflecting films B5-3a and B5-3b was rubbed 20 times using a steel wool #0000 under a load of 50 to 1 kg to detect the load value when a change in haze exceeded 5%,

TABLE 3

| Composition used | Refractive index | Anti-reflecting film B4-3a | | | Anti-reflecting film B4-3b | | |
|---|---|---|---|---|---|---|---|
| | | Reflectance | Haze | Film hardness | Reflectance | Haze | Film hardness |
| Example B1 | 1.43 | 1.5 | 1.4 | 1 Kg 30 forward and backward motions | 1.2 | 19.0 | 1 Kg 30 forward and backward motions |
| Example B2 | 1.44 | 1.6 | 1.5 | 1 Kg 30 forward and backward motions | 1.4 | 19.5 | 1 Kg 30 forward and backward motions |
| Example B3 | 1.45 | 1.7 | 1.6 | 1.5 Kg | 1.5 | 19.0 | 1 Kg 30 forward and backward motions |
| Example A2 | 1.43 | 1.5 | 1.4 | 1 Kg 20 forward and backward motions | 1.2 | 19.0 | 1 Kg 20 forward and backward motions |
| Comparative Example B1 | 1.42 | 1.4 | 1.3 | 300 g | 1.1 | 19.0 | 300 g |
| Comparative Example B2 | — | — | — | — | — | — | — |

TABLE 4

| Composition used | Anti-reflecting film B5-3a Film hardness | Anti-reflecting film B5-3b Film hardness |
|---|---|---|
| Example B 1 | 1 Kg 20 forward and backward motions | 1 Kg 20 forward and backward motions |
| Example B 2 | 1 Kg 20 forward and backward motions | 1 Kg 20 forward and backward motions |
| Example B 3 | 1 Kg 20 forward and backward motions | 1 Kg 20 forward and backward motions |

INDUSTRIAL APPLICABILITY

As mentioned above, the coating composition according to the present invention can be prepared in the state of a coating liquid in which a binder system primarily containing a fluorine-containing component (a) having at least one of an ionizing radiation-curable group and a heatcurable functional group, and both an ionizing radiation-curable functional group and a heatcurable polar group as a whole is dissolved and dispersed and an inorganic superfine particle of the order of submicron in size is dispersed in a colloidal state.

Because a fluorine-containing binder is a material having a low refractive index, a coating layer having a low refractive index can be formed. However, a coating layer comprising of the fluorine-containing binder tends to have insufficient hardness and strength because it contains a fluorine atom having a small interatomic force. On the contrary, when forming a coating layer by using the coating composition of the present invention, the coating layer can be cured by irradiation with ionizing radiation and in addition, is tightened by the coagulating force and hardness of the inorganic superfine particle dispersed in a colloidal state in the cured fluorine-containing binder and it is therefore possible to avoid a significant reduction in the hardness and strength of the coating layer even when the fluorine content in the binder component is increased much in order to reduce refractive index.

Also, the inorganic superfine particle capable of dispersing in a colloidal state in the coating composition of the present invention produces the effect of tightening a coating layer sufficiently in such a small amount as to exert no or a little influence on the refractive index-reducing action and layer-forming characteristics of the fluorine-containing component, and it is unnecessary to formulate the inorganic superfine particle in such an amount as to raise refractive index and to make the layer fragile. Since the inorganic superfine particle has a size of the order of submicron, it also has a high effect on transparency.

Further, since the binder system of the coating composition of the present invention contains a heatcurable polar group, a coating layer formed by using the coating composition of the present invention has high adhesion to the surface to be coated by the action of the heatcurable polar group as a polar group. Also, when the coating layer is heat-cured, crosslinked density can be raised and also the hardness and strength of the coating layer can be improved by two curing reactions including an ionizing radiation-curing reaction and heat-curing reaction.

Therefore, a coating layer is obtained which has a large fluorine content and therefore a low refractive index, possesses a hardness and strength enough to fit for practical use and is also superior in adhesion and transparency.

Also, according to the present invention, the aforementioned coating layer can be produced by a coating method using the above coating composition and the present invention is therefore superior in the mass-productivity of a coating layer.

The coating layer according to the present invention is produced using the coating composition of the present invention and has a structure in which the inorganic superfine particle is dispersed in a colloidal state in the fluorine-containing binder cured by ionizing radiation. As is clear from the aforementioned fact, this coating layer has a very low refractive index, possesses a hardness and strength enough to fit for practical use and is superior in adhesion and transparency and also in mass-productivity. This coating layer is desirably used as optical thin layers, particularly a low-refractive index layer of an anti-reflecting layer, of which a low refractive index is demanded.

An anti-reflecting layer containing the coating layer according to the present invention is preferably applied to display surfaces of liquid crystal display devices, CRTs or the like.

The invention claimed is:

1. A coating composition comprising:
   (A) a binder system which comprises at least one binder component containing a fluorine-containing component (a) having one or both of a functional group which is cured by ionizing radiation, and a polar group which is heat-cured in its molecule, and and
   (B) an inorganic particle of the order of submicron in size which can be dispersed in a colloidal state in a liquid medium for preparing a coating liquid;
   wherein 5 mol % or more of hydrogens bonded to carbons of the whole binder component in the binder system are substituted with fluorine atom;
   wherein the refractive index of the inorganic particle (B) is 1.60 or less; and
   wherein of the inorganic superfine particle (B) has a polymerizable functional group on the surface thereof.

2. A coating composition according to claim 1, wherein the inorganic particles (B) of the order of submicron in size are dispersed in a colloidal state in the liquid medium, the liquid medium being a solvent dissolving or dispersing the binder system (A) therein or the binder system (A) itself in a liquid state.

3. A coating composition according to claim 1, wherein the fluorine-containing component (a) having both the ionizing radiation-curable functional group and the heat-curable polar group.

4. A coating composition according to claim 1, wherein the binder system contains, as essential binder components, the fluorine-containing component (a) having the ionizing radiation-curable functional group, and another binder component having at least a heat-curable polar group.

5. A coating composition according to claim 1, wherein the binder system contains, as essential binder components, the fluorine-containing component (a) having a the heat-curable polar group, and another binder component having at least an ionizing radiation-curable functional group.

6. A coating composition according to claim 1, wherein the binder system contains, as an essential binder components, the fluorine-containing component (a), and a non-fluorine-containing component having both an ionizing radiation-curable functional group and a heat-curable polar group.

7. A coating composition according to claim 1, wherein the binder system contains, as essential binder components, the fluorine-containing component (a), and a polyfunctional (meth)acrylate having two or more ethylenic unsaturated bonds.

8. A coating composition according to claim 1, wherein binder system further comprises another binder component having the characteristics that at least a part of hydrogens bonded to carbons in a molecule of the another binder component are substituted with fluorine atoms.

9. A coating composition according to claim 1, wherein the heat-curable polar group of the binder component is a hydrogen bond-forming group.

10. A coating composition according to claim 9, wherein the hydrogen bond-forming group is selected from the group comprising of a hydroxyl group, a carboxyl group, an amino group and an epoxy group.

11. A coating composition according to claim 10, wherein the hydrogen bond-forming group is a hydroxyl group.

12. A coating composition according to claim 1, wherein all fluorine-containing components contained in the binder system respectively have a refractive index of 1.45 or less.

13. A coating composition according to claim 1, wherein the primary particle diameter of the inorganic particle (B) is in a range from 1 nm to 500 nm.

14. A coating composition according to claim 1, wherein the inorganic particle (B) is at least one fine particle selected from silica, alumina, magnesium fluoride and calcium fluoride.

15. A coating composition according to claim 1, wherein the inorganic particle (B) is an inorganic superfine particle having a hydrophobically treated surface.

16. A coating composition according to claim 1, wherein the content of the inorganic particle (B) is in a range from 0.1 to 70% by weight based on the whole solid content.

17. A coating composition according to claim 1, wherein the inorganic particle (B) has at least one of an ionizing radiation-curable functional group and a heat-curable polar group as polymerizable functional groups on the surface thereof.

18. A coating composition according to claim 1, wherein an introduced part having a polymerizable functional group exists on the surface of the inorganic particle (B) in a proportion of 1 or more parts by weight based on 100 parts by weight of the particle part of the inorganic particle (B).

19. A coating composition according to claim 1, wherein the number average molecular weight of the introduced part having a polymerizable functional group is 300 to 20000.

20. A coating composition according to claim 1, wherein the content of the inorganic particle (B) is in a range from 0.1 to 99.5% by weight based on the whole solid content.

21. A coating composition according to claim 1, the composition being used to form an optical thin layer.

22. A coating composition according to claim 21, the composition being used to form a low-refractive index layer of an anti-reflecting layer.

23. A coating layer obtained by applying the coating composition according to claim 1 to a surface of an object for coating process and being cured.

24. A coating layer according to claim 23, wherein the coating layer has a refractive index of 1.45 or less.

25. A coating layer according to claim 23, wherein the refractive index is 1.45 or less and the haze value prescribed in JIS-K7361-1 is equal to the haze value of only the substrate or limited such that the difference between the both is within 0.1% when the layer thickness is 0.05 to 0.3 m.

26. A coating layer according to claim 23, wherein the refractive index is 1.45 or less and the load at which a change in haze is found when rubbing the surface of the layer 20 times by using a steel wool #0000 is 1 Kg or more when the thickness of the layer is 0.05 to 0.3 µm.

27. A coating layer according to claim 23, wherein the refractive index is 1.46 or less and a change in haze after and before the surface of the layer is rubbed 20 times using a steel wool #0000 at a load of 200 g is 5% or less when the thickness of the layer is 0.05 to 0.3 µm.

* * * * *